(12) United States Patent
Lewandowski

(10) Patent No.: US 9,710,776 B1
(45) Date of Patent: Jul. 18, 2017

(54) OVERLAY BAG TAG

(71) Applicant: American Airlines, Inc., Fort Worth, TX (US)

(72) Inventor: James Clair Lewandowski, Grapevine, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

(21) Appl. No.: 15/089,096

(22) Filed: Apr. 1, 2016

Related U.S. Application Data

(60) Provisional application No. 62/250,289, filed on Nov. 3, 2015.

(51) Int. Cl.
    *G06F 15/00*      (2006.01)
    *G06Q 10/08*      (2012.01)
    *G06K 7/14*       (2006.01)
    *G06Q 50/28*      (2012.01)

(52) U.S. Cl.
    CPC ........... *G06Q 10/08* (2013.01); *G06K 7/1434* (2013.01); *G06Q 50/28* (2013.01)

(58) Field of Classification Search
    USPC .............................................. 358/1.13–1.15
    See application file for complete search history.

(56) References Cited

U.S. PATENT DOCUMENTS

2011/0082810 A1* 4/2011 Holtz-Davis ........ G06Q 10/083
                                                    705/330

* cited by examiner

*Primary Examiner* — Saeid Ebrahimi Dehkord
(74) *Attorney, Agent, or Firm* — Haynes and Boone LLP

(57) ABSTRACT

An overlay bag tag is configured to cover an old bag tag that is attached to a bag of a passenger, with the overlay bag tag including an original bag tag number of the old bag tag and an updated bag route. The overlay bag tag is used to reroute the bag according to the updated bag route when there is a change in a passenger route of the passenger after the bag is checked in with the airlines so that the bag travels with the passenger. If the bag cannot travel with the passenger, the system reroutes the bags to the final destination of the passenger.

14 Claims, 16 Drawing Sheets

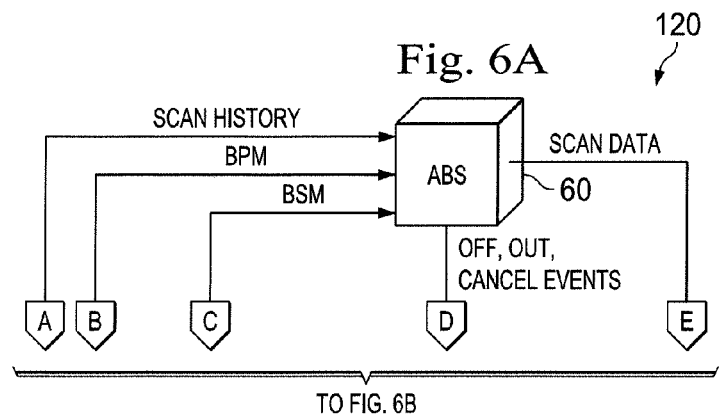
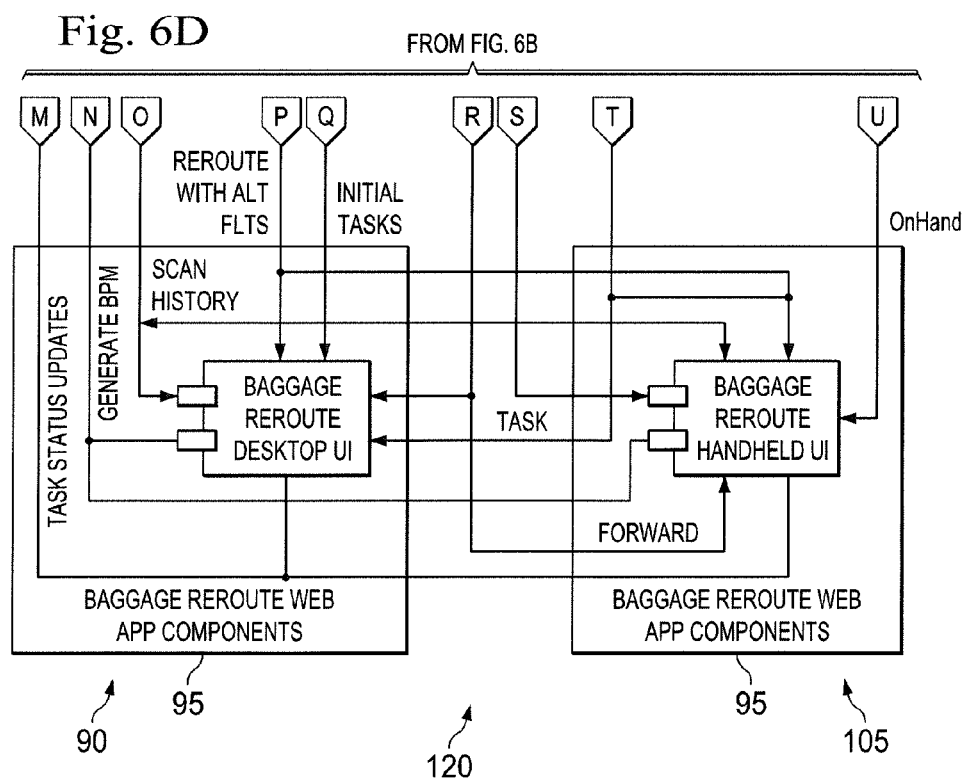

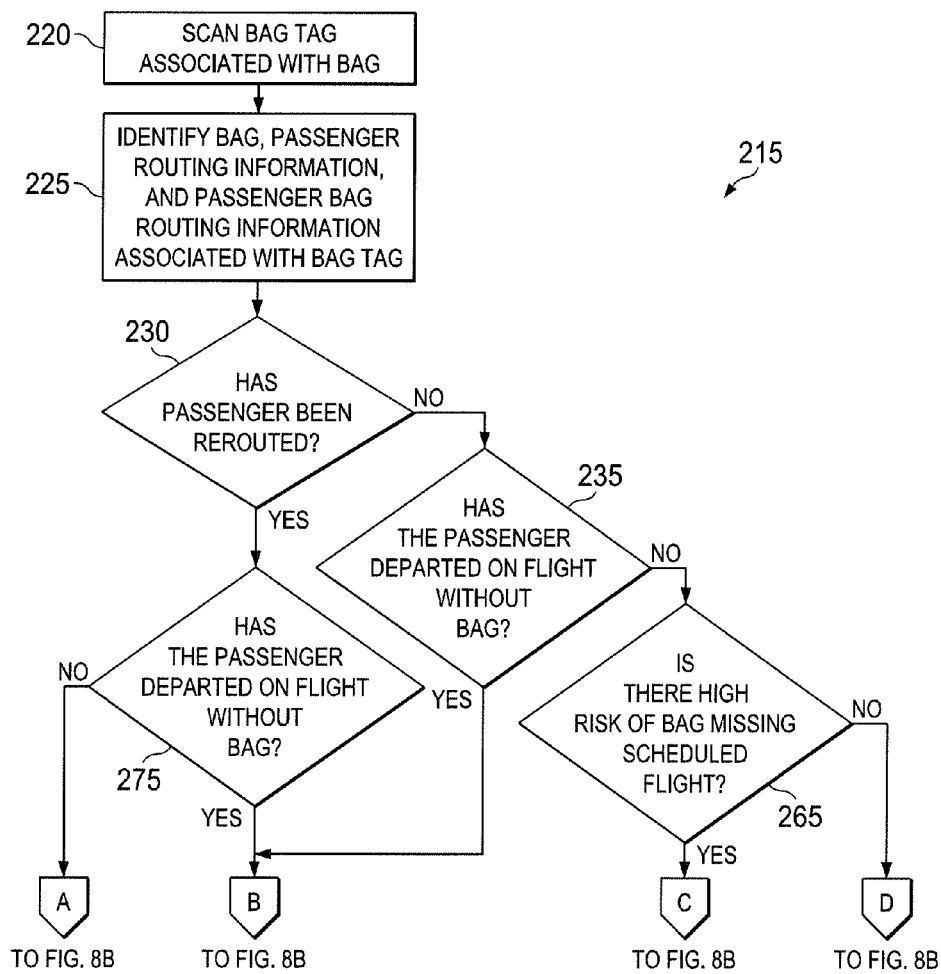

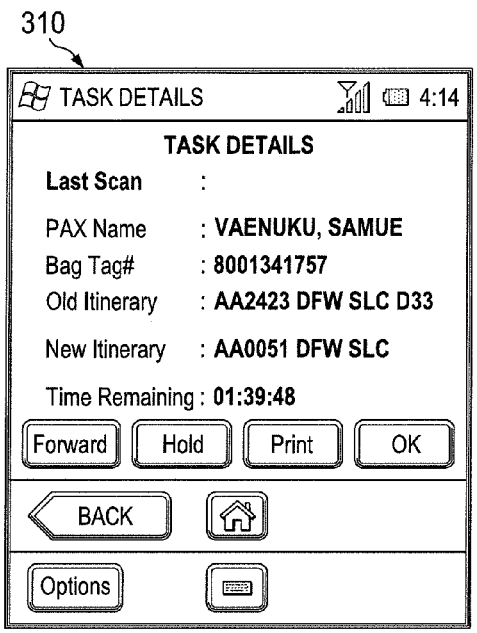
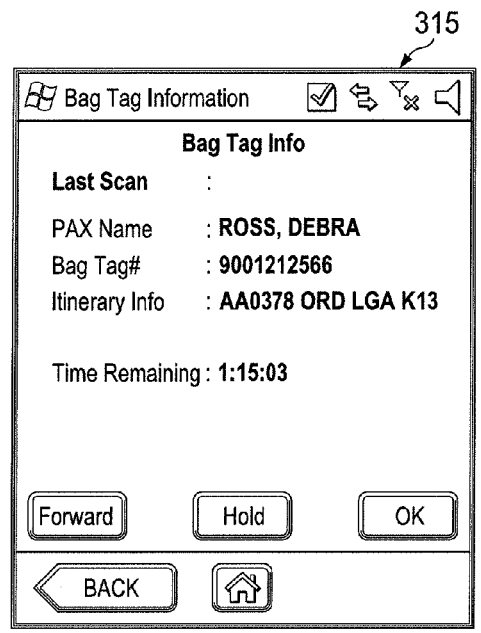
Fig. 11A  Fig. 11B
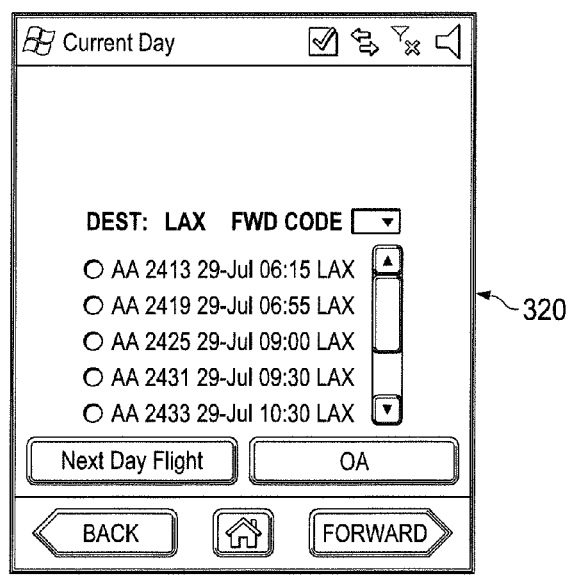
Fig. 11C

OVERLAY BAG TAG

CROSS-REFERENCE TO RELATED APPLICATION

This application claims the benefit of the filing date of, and priority to, U.S. Application No. 62/250,289, filed Nov. 3, 2015, the entire disclosure of which is incorporated herein by reference.

BACKGROUND

Generally, when a passenger checks her or his bag with an airline, a bag tag is generated and attached to the bag. The bag tag includes an original bag number along with customer information and routing information relating to an itinerary of the passenger. The bag tag is used by a baggage sortation system. Generally, the baggage sortation system aids in loading the bag onto the same aircraft as the passenger, and thus the bag arrives with the passenger at the final destination of the passenger. Often, the passenger is given a new itinerary after the bag tag has been attached to the bag. When this occurs, the baggage sortation system cannot use the bag tag to route the bag in accordance with the new itinerary. Additionally, the bag may become separated from the passenger and/or otherwise deviate from the itinerary of the passenger. In this case, the airline forwards the bag to the final destination of the passenger. However, the abilities of the baggage sortation system are limited due to, at least in part, the airline relying upon notes handwritten on the bag tag or the generation of a new bag tag that does not incorporate the original bag tag number.

Therefore, what is needed is a system, method, or apparatus that addresses one or more of the foregoing issues, among others.

BRIEF DESCRIPTION OF THE DRAWINGS

FIGS. 6A-6D form a data architecture view of the system of FIG. 2, according to an exemplary embodiment.

FIGS. 8A and 8B are flow chart illustrations of a method of operating the system of FIG. 2, according to an exemplary embodiment.

FIGS. 11A-11C are diagrammatic illustrations of a user interface of the mobile device of FIG. 1, according to an exemplary embodiment.

DETAILED DESCRIPTION

Figure 1:
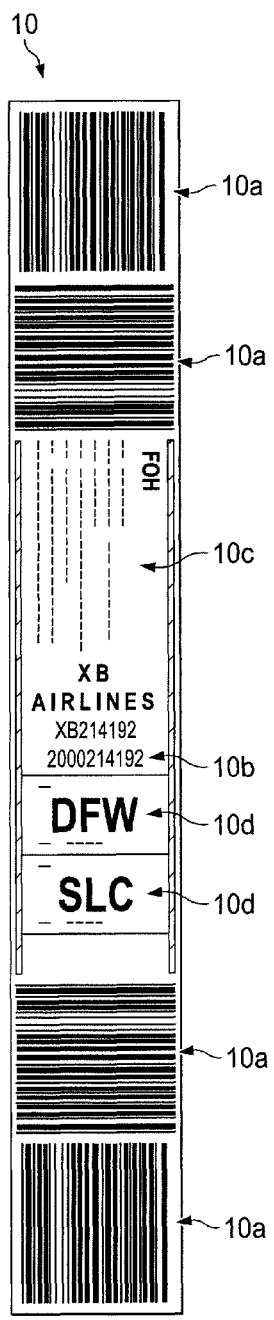
FIG. 1 is an illustration of a bag tag, according to an exemplary embodiment.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an exemplary embodiment, FIG. 1 illustrates an embodiment of an original bag tag 10. Generally, when a customer and/or passenger of an airline checks her or his bag with the airline, the original bag tag 10 is generated and attached to the bag. Usually, the bag is returned to the passenger at the final destination of the passenger. The bag may be any type of luggage, checked item, or other type of baggage. The original bag tag 10 may include a machine readable code 10a, an original bag tag number 10b, passenger information 10c, and routing information 10d, with the routing information of the bag matching the routing information of the passenger (i.e., the bag and the passenger have the same itinerary).

Figure 2:
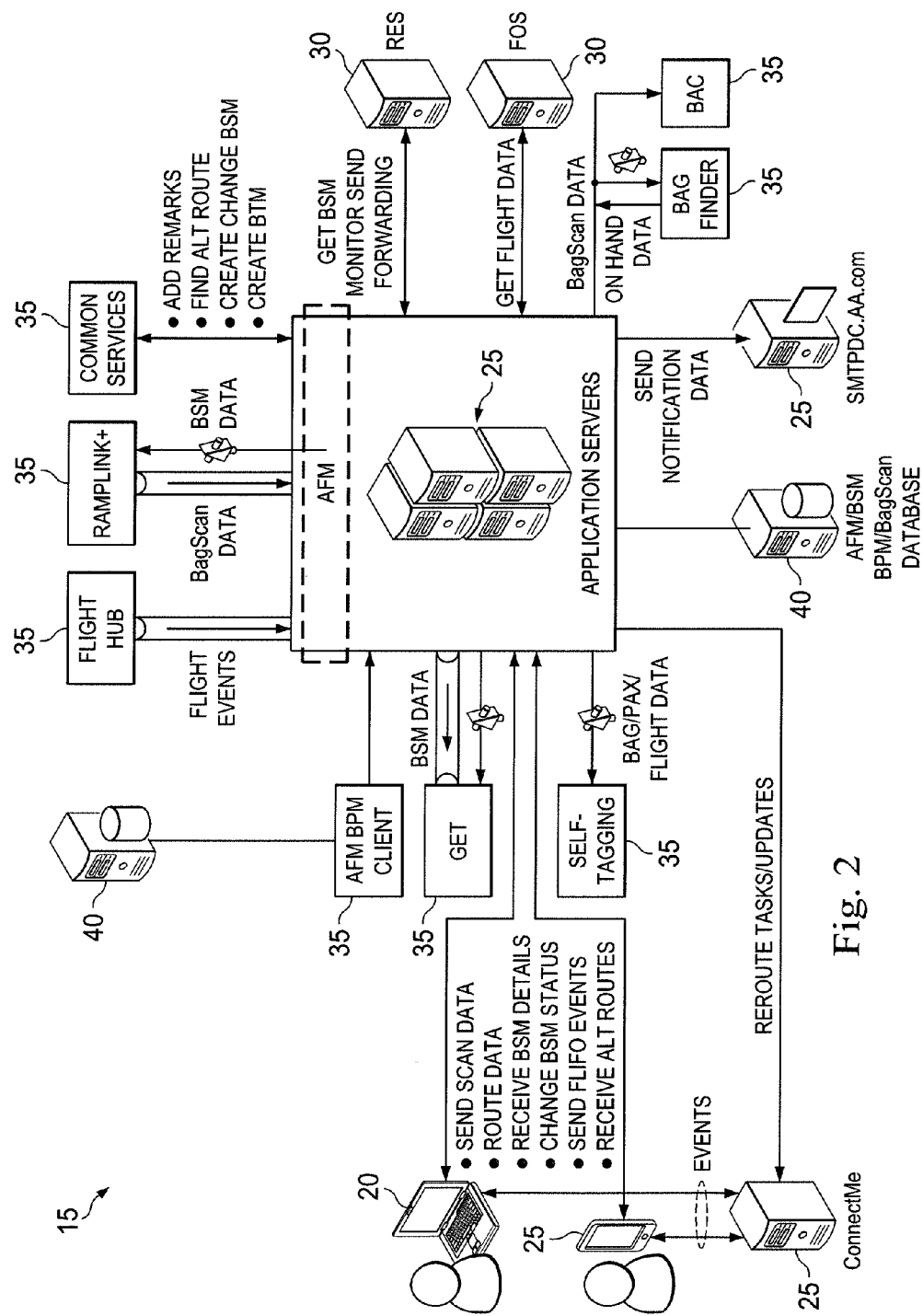
FIG. 2 is a conceptual architecture view of a system including a mobile device, according to an exemplary embodiment.

The original bag tag 10 may be used by a Bag Rerouting system ("BRR") that is generally referred to by the reference numeral 15 in FIG. 2. BRR 15 may include one or more of: a computer 20, a mobile device 25, a server 30, an application 35, and a database 40, all of which are operably coupled together, and in communication via a network. Generally, BRR 15 aids in loading the bag onto the same aircraft as the passenger, and thus the bag arrives with the passenger at the final destination of the passenger. BRR 15 scans the machine readable code 10a to quickly identify and/or update the passenger information and the routing information of the bag. However, the passenger may be given a new itinerary after the original bag tag 10 has been attached to the bag. Additionally, the route of the bag may deviate from the original itinerary of the passenger if the bag misses a flight that forms a portion of the original itinerary of the passenger. In an exemplary embodiment, BRR 15 aids in: rerouting the bag when the passenger receives an updated itinerary after the passenger checks the bag with the airline carrier; forwarding the bag when the bag deviates from the passenger's original itinerary or from the passenger's updated itinerary; and/or updating the timestamps and/or other information for bags that are classified as "on hand" or "on hold." This improves the likelihood that the bag and the passenger arrive at the final destination on the same flight or arrive at the final destination within a short period of time. In an exemplary embodiment, BRR 15 also creates a baggage source message ("BSM") or a baggage transfer message ("BTM") when moving the bag independently of the passenger. Thus, in an exemplary embodiment, BRR 15 is capable of routing the bag based on an updated passenger itinerary or an updated bag itinerary; accounting for rerouted and forwarded bags in a Load Planning application (weight and balance); providing a bag tag overlay 45 (shown in FIGS. 3 and 4) that is recognized/accepted when electronically scanned using other applications such as RampLink+ and T-Link; and providing the bag tag overlay 45 such that bags connecting to other airlines "("OA")" are manifested in the OA systems. In general, BRR 15 provides a proactive approach for bag rerouting. In an exemplary embodiment, an itinerary is a route and a route is an itinerary.

Figure 3:
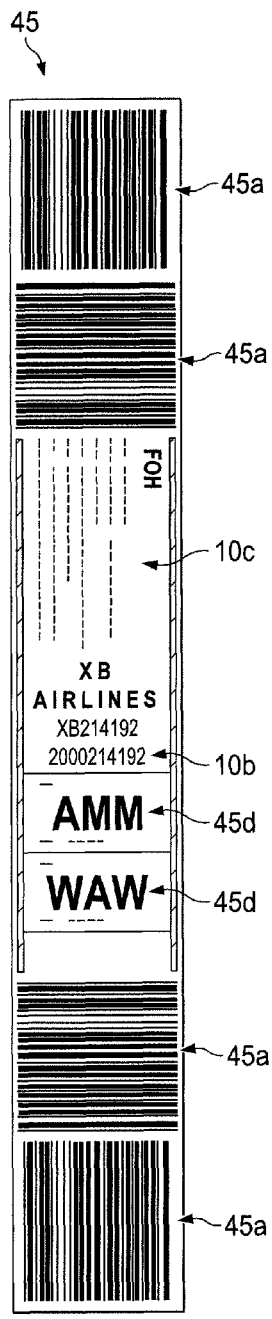
FIG. 3 is an illustration of a bag tag overlay, according to an exemplary embodiment.
Figure 4:
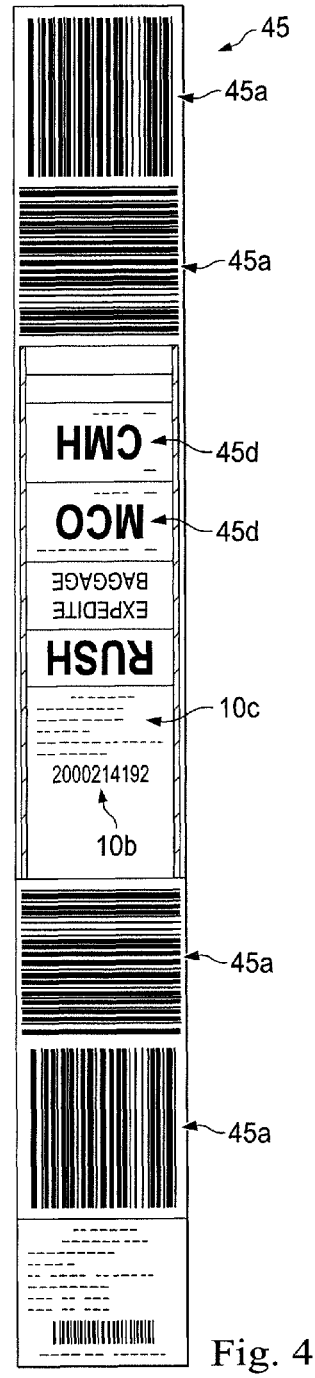
FIG. 4 is an illustration of another bag tag overlay, according to an exemplary embodiment.

In an exemplary embodiment, FIG. 3 illustrates an embodiment of the bag tag overlay 45. Generally, the bag tag overlay 45 includes a machine readable code, such as a bar code 45a, the original bag tag number 10b, the passenger information 10c, and routing information 45d. In an exemplary embodiment, FIG. 4 illustrates the bag tag overlay 45 when the bag tag overlay 45 is expedited or rushed bag tag overlay. The machine readable code is not limited to a bar code 45a and may be a "Q code," a "QR code," or any other type of machine readable code.

In one or more exemplary embodiments, each of the computer 20 and the mobile device 25 includes a computer processor and a computer readable medium operably coupled thereto. Instructions accessible to, and executable by, the computer processor are stored on the computer readable medium. A database is also stored in the computer readable medium. In an exemplary embodiment, each of the computer 20 and the mobile device 25 includes an input device and an output device. In an exemplary embodiment, web browser software is stored in the computer readable medium. In an exemplary embodiment, the input device is a keyboard, mouse, or other device coupled the computer 20 or the mobile device 25 that sends instructions to the computer 20 or the mobile device 25. In an exemplary embodiment, the input device and the output device include a graphical display, which, in several exemplary embodiments, is in the form of, or includes, one or more digital displays, one or more liquid crystal displays, one or more cathode ray tube monitors, and/or any combination thereof. In an exemplary embodiment, the output device includes a graphical display, a printer, a plotter, and/or any combination thereof. In an exemplary embodiment, the input device is the output device, and the output device is the input device. In several exemplary embodiments, each of the computer 20 and the mobile device 25 is a thin client. In several exemplary embodiments, each of the computer 20 and the mobile device 25 is a thick client. In several exemplary embodiments, each of the computer 20 and the mobile device 25 functions as both a thin client and a thick client. In several exemplary embodiments, each of the computer 20 and the mobile device 25 is, or includes, a telephone, a personal computer, a personal digital assistant, a cellular telephone, other types of telecommunications devices, other types of computing devices, and/or any combination thereof. In several exemplary embodiments, each of the computer 20 and the mobile device 25 includes a plurality of remote user devices. In an exemplary embodiment, each of the computer 20 and the mobile device 25 is capable of running or executing an application. In one or more exemplary embodiments, the application is an application server, which in several exemplary embodiments includes and/or executes one or more web-based programs, Intranet-based programs, and/or any combination thereof. In an exemplary embodiment, the application includes a computer program including a plurality of instructions, data, and/or any combination thereof. In an exemplary embodiment, the application written in, for example, HyperText Markup Language (HTML), Cascading Style Sheets (CS S), JavaScript, Extensible Markup Language (XML), asynchronous JavaScript and XML (Ajax), and/or any combination thereof. In an exemplary embodiment, the application a web-based application written in, for example, Java or Adobe Flex, which pulls real-time information from the server and/or the relational database management system. In an exemplary embodiment, the application pulls real-time information from the server and/or the relational database management system, upon the execution, opening or start-up of the application. In an exemplary embodiment, the application is stored on the computer readable medium and/or in the database. In one or more exemplary embodiments, the data input by the user is considered user parameters.

Figure 5:
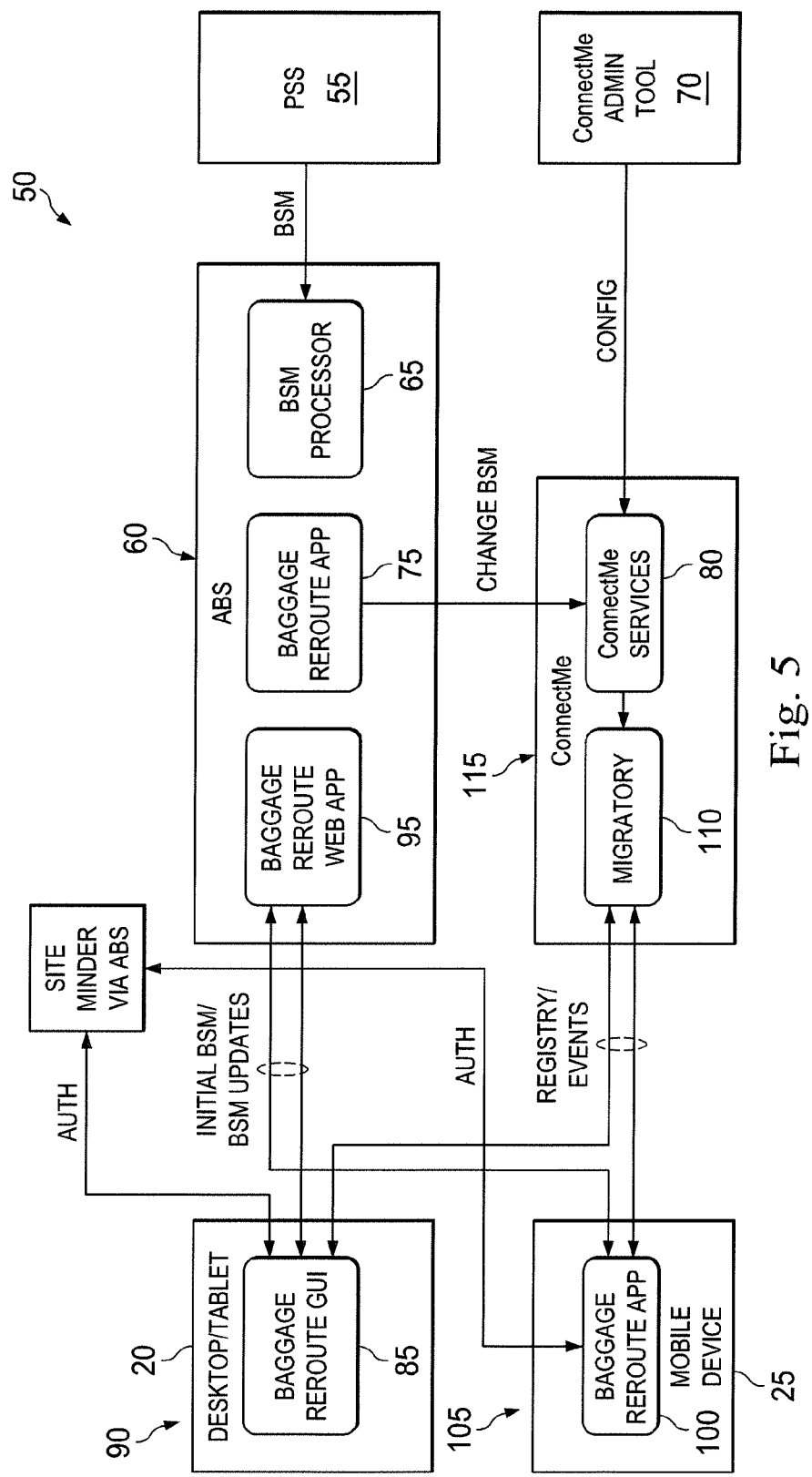
FIG. 5 is a data flow diagram of the system of FIG. 2, according to an exemplary embodiment.
Figure 6B:
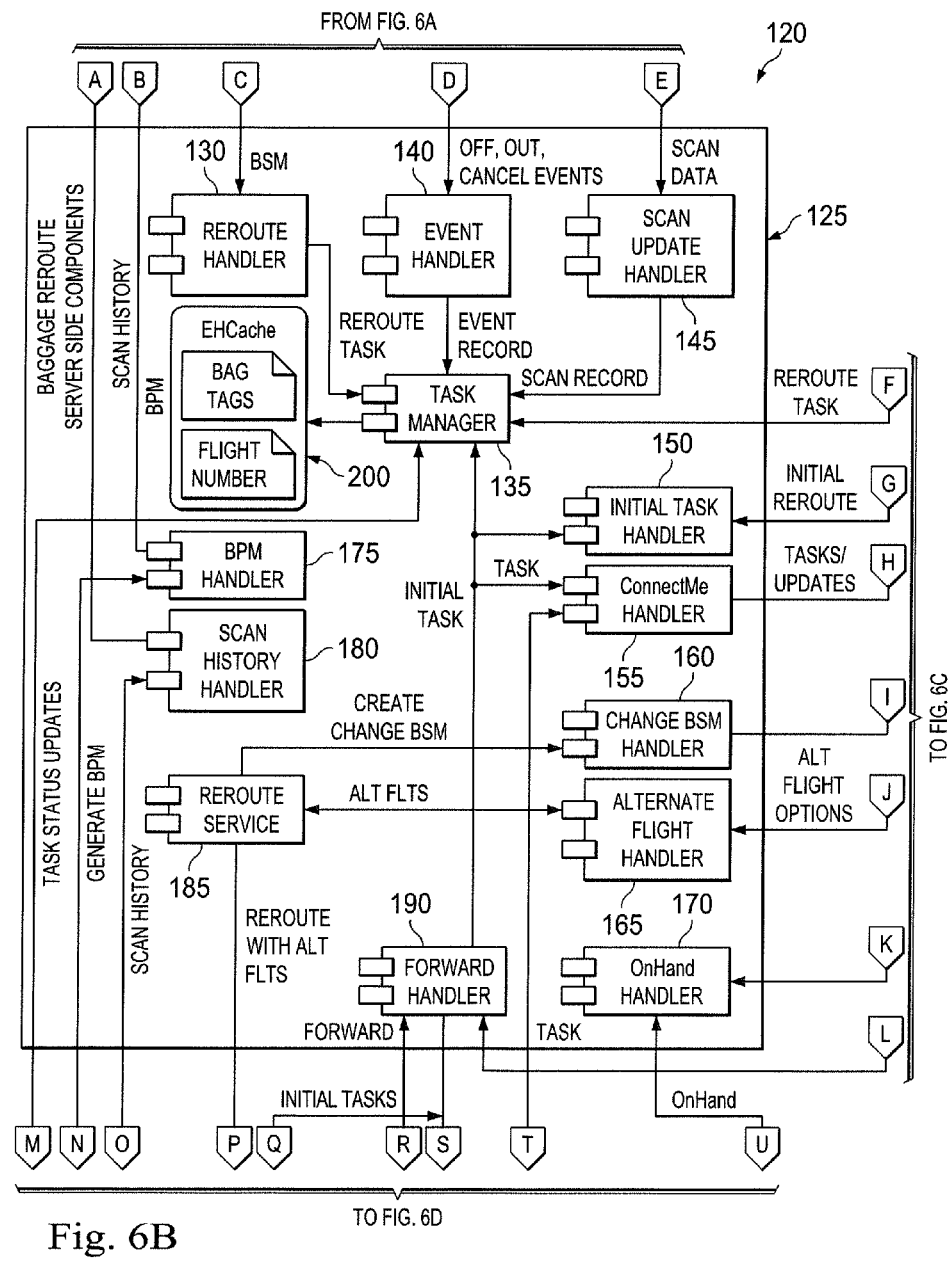
Figure 6C:
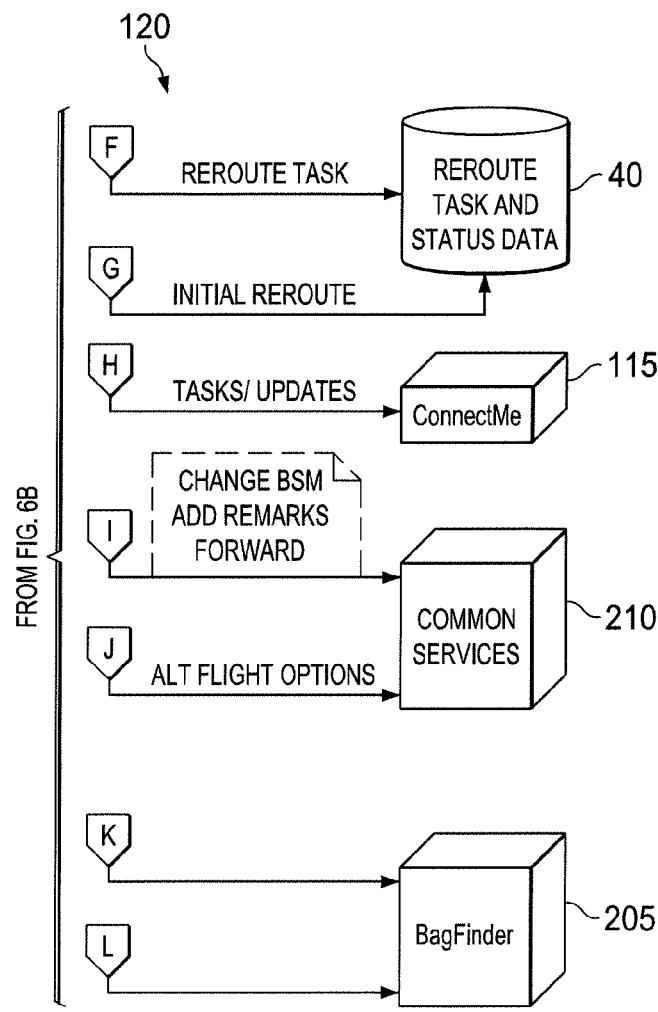

In an exemplary embodiment, a data flow diagram of BRR 15 is generally referred to by the reference numeral 50 in FIG. 5. Generally, when the bag is checked-in with the airline, a passenger service system ("PSS") 55 sends a BSM to Advanced Bag Services ("ABS") 60 for the checked-in bag. These BSMs are processed by a BSM processor 65 and persisted in an ABS database for use by other systems. In an exemplary embodiment, ABS 60 is the main source of information for BRR 15. In an exemplary embodiment, a ConnectMe Admin tool 70 is used to add event subscription configurations. In an exemplary embodiment, a BRR application 75 is configured to publish change BSMs, change BSM status, and flight status events to ConnectMe services 80, which in turn sends these events to respective registered users.

In an exemplary embodiment, the desktop computer 20 includes a user interface ("UI") capable of displaying a BRR desktop client UI 85 to form a BRR desktop client 90. In an exemplary embodiment, a user logs in to BRR 15 using the BRR desktop client 90. In some embodiments, the user is a bag handler. The user also may select a region and/or airline. Then, the BRR desktop client 90 lists "tasks" that need manual handling upon the user's login and user selection of a region and/or airline. In an exemplary embodiment, an open task may include a required action relating to a bag and include any one or more of a bag tag number of the bag; a passenger first and last name ("PAX"); a class of service; an original flight number; an original flight gate; an original destination city; a new flight number; a new flight carrier; a new flight departure gate; a new flight destination city; a new flight departure time; a new flight status; and a last scan location. The BRR desktop client 90 may also act as a monitoring tool. In an exemplary embodiment, the user is able to take action on each of the tasks and track a "task status" associated with the task. In an exemplary embodiment, the server 30 hosts elements and components of the BRR desktop client 90 as a BRR web application 95. Thus in one embodiment, the BRR desktop client 90 is presented to the user through a browser. In an exemplary embodiment, AA Hybrid HTML 5 solution is used that uses JQuery mobile for BRR desktop client 90 component integration. In an exemplary embodiment, JSON format is used between the desktop computer 20 and the server 30. In an exemplary embodiment, cache-manifest is used to cache HTML pages in disconnected mode. In an exemplary embodiment, HTML5 local storage is used to maintain persistent data. In an exemplary embodiment, the user of the BRR desktop client 90 selects a task to assign a handler, makes a phone call to the handler, or decides to handle the task himself or herself. Alternatively, the user is provided with a list of handlers from which the user selects a handler to assign the task. To assign the task, the user selects assign task button or assign handler button. This updates the assign status in the server 30. Also, it updates the handler name for this task.

In an exemplary, the mobile device 25 includes a UI capable of displaying a BRR mobile application 100 to form a BRR mobile client 105. The BRR mobile client 105 allows a user or handler to view a task and take action for that task by scanning the bag tag and printing the overlay bag tag 45 to reroute the bag. In an exemplary embodiment, .NET is used for building the BRR mobile client 105. In an exemplary embodiment, the server 30 hosts elements and components of the BRR mobile client 105 as a web application. In an exemplary embodiment, Scanner Plugin handles the barcode scanning functionality of the mobile device 25. In an exemplary embodiment, device software is used to connect to an external scanner (not shown). In an exemplary embodiment, a barcode scan result is processed by this plugin. In an exemplary embodiment, Bluetooth Print Plugin component makes the device 25 connect to a Bluetooth printer over Bluetooth and send the data that is to be printed to the connected printer. In an exemplary embodiment, data is transmitted to the mobile device 25 on a real time basis. Additionally, the mobile device 25 has cache capabilities in disconnected mode and is capable of processing this cache data when there is connectivity to the server 30. In an exemplary embodiment, the mobile device 25 is able to scan multiple tags before processing them. In an exemplary embodiment, the user of the mobile device 25 searches for a specific bag or group of bags by tag number or flight number by scanning multiple a bag tag to quickly identify whether the scanned bag tag has the specific bag tag number or includes the specific flight number. Alternately, once a task is assigned to the handler, the task shows up in the mobile device 25. When the user of the mobile device 25 elects to look at the task, BRR desktop client 90 indicates that the handler is aware of the assigned task and the server 30 is updated with an accepted status. One the handler finds the bag that needs an action, the handler scans the original bag tag 10 using the mobile device 25. In an exemplary embodiment, scan data is read and checked against the cache data to identify the tasks that needs an action. Once found, the mobile device 25 prints the overlay bag tag 45, which updates the server 30 with handled status or "closed" status and in turn, BRR desktop client 90 indicates that the task has been handled. In an exemplary embodiment, the BRR mobile client 105 and/or the BRR desktop client 90 registers during login with a ConnectMe service 80 through Migratory 110 to receive specific events, such as specific station or a flight. In an exemplary embodiment, the BRR mobile client 105 and/or the BRR desktop client 90 gets initial change BSM data from the BRR web application 195 after the login. In an exemplary embodiment, any status change to BSM message made through the BRR mobile client 105 or BRR desktop client 90 is persisted in a BRR database.

In an exemplary embodiment, the server 30 is built upon J2EE and Spring frame work. The server 30 makes web services calls to ABS 60 to get initial tasks (change BSMs) for a station. In an exemplary embodiment, BRR 15 makes web services calls to ABS 60 to update Baggage Process Message ("BPM"). ABS 60 pushes new tasks to this component using spring integration queues. In an exemplary embodiment, the database 40 is an Oracle database and is used to store tasks and task status. In an exemplary embodiment, BRR 15 includes logic to determine where tasks belong, task status determination, and pushing tasks and task updates to the BRR mobile client 105 and the BRR desktop client 90. In an exemplary embodiment, ConnectMe 115 is used for pushing these tasks to users.

In an exemplary embodiment, a component diagram of BRR 15 is generally referred to by the reference numeral 120 in FIGS. 6A-6D. In an exemplary embodiment, BRR 15 includes a variety of server side components 125, such as a Reroute Handler 130, a Task Manager 135, an Event Handler 140, a Scan Update Handler 145, an Initial Task Handler 150, a Connect Me Handler 155, a Change BSM Handler 160, an Alternate Flight Handler 165, an OnHand Handler 170, a BPM Handler 175, a Scan History Handler 180, a Reroute Service 185, a Forward Handler 190, and a EHCache 200. In an exemplary embodiment, components of the BRR web application 95 for each of the BRR desktop client 90 and BRR mobile client 105 communicate with a variety of services, applications, and databases, such as for example BagFinder 205, Common Services 210, ConnectMe 115, and ABS 60 via the BRR Server side components 125. In an exemplary embodiment, ABS 60 sends tasks (change BSMs, BSMs for bags that are separated from passengers, BSMs for bags that have potential of missing flight) to the BRR desktop client 90 and the BRR mobile client 105 via the side components 125. In an exemplary embodiment, BRR Server side components 125 process these tasks before updating the database 40 and pushes these tasks to respective users through ConnectMe 115. In an exemplary embodiment, ABS 60 also sends OUT, OFF and CANCEL events and scan information to the components 125. In an exemplary embodiment, BRR Server side components 125 update the database 40 with flight status by processing event and scan data. In an exemplary embodiment, BRR Server side components 125 also send these updates to interested users through ConnectMe 115. In an exemplary embodiment, actions performed within each of the BRR desktop client 90 and BRR mobile client 105 are processed by the BRR Server side components 125. This also updates the user action status in the database 40. For a bag to be forwarded, BRR Server side components 125 looks for alternative flights by calling Common Services 210 web services and provides a list of flight options to user via the BRR desktop client 90 and/or the BRR mobile client 105. Once a flight is selected for bag reroute, the following actions are taken by BRR Server side components 125: it creates BSM, BPM and adds remark to PNR; creates forwarding message if International flight is involved; creates BTM if OA involved; creates change BSM, BTM, forwarding and adding remarks is done by calling CS web service; and BPM gets created by calling ABS web services. Bags onhand are processed by calling BagFinder 205 web services that handles onhand.

In an exemplary embodiment, the Reroute Handler 130 listens for incoming task messages from ABS 60. In an exemplary embodiment, the Reroute Handler 130 then extracts task object and calls Task Manager 135 to process the task. In an exemplary embodiment, ABS 60 sends tasks that BRR 15 is interested in, such as BSMs in the following scenarios: if there is a change BSM related to an itinerary change; any potential where bag and passenger may be separated; any bags where passengers have already departed; and any bag that meets auto forwarding criteria. ABS 60 identifies such BSM messages, builds the task object, and sends these objects using Spring integration queues to the Baggage Reroute application 75 which is deployed as separate module under ABS. These objects include information regarding any one or more of: passenger first and last name; passenger class which need to show only priority indicator for premium passengers; bag tag numbers; original flight details, such as flight number, destination city, and gate; new flight details such as flight number, carrier, destination city, gate, and departure time; new flight status, finalize, out, off etc.; and last scan details (last known location) along with scan history.

In an exemplary embodiment, the Event Handler 140 listens for incoming flight event messages and extracts the object and sends it to the Task Manager 135 for processing the event data. In an exemplary embodiment, BRR 15 is interested in OFF, OUT and CANCEL events for a flight. In an exemplary embodiment, ABS 60 filters the events that BRR 15 is interested in by looking at data in the EH Cache 200, such as bag tag and flight numbers. ABS 60 sends these events using Spring integration queues. In an exemplary embodiment, the EHCache 200 gets populated with flight number by the Task Manager 135 while processing tasks.

In an exemplary embodiment, the Scan Update Handler 145 listens for incoming scan updates and then passes this information to the Task Manager 135 for processing the scan data. In an exemplary embodiment, ABS 60 filters the scan data for bag tags that are present in the EHCache 200. In an exemplary embodiment, ABS 60 sends this scan data in an object using Spring integration queues.

In an exemplary embodiment, the Task Manager 135 is the main component to be called by the Reroute Handler 130, the Event Handler 140, and the Scan Update Handler 145 to process the task and task updates. In an exemplary embodiment, the Task Manager 135 processes the task and extracts required fields to store in the database 40. In an exemplary embodiment, the Task Manager 135 also updates the EHCache 200 with new flight number and bag tag numbers, which is used by the Event handler 140 and the Scan Update Handler 145. In an exemplary embodiment, the Task Manager 135 also processes the events that the Event Handler 140 passes. In an exemplary embodiment, the Task Manager 135 extracts events and updates the respective records in the database 40 with the event. In an exemplary embodiment, the Task Manager 135 also processes scan data that the Scan Update handler 145 passes and extracts the scan data and updates the respective record in the database 40. In an exemplary embodiment, the Task Manager 135 also sends these messages to the ConnectMe Handler 155, which in turn sends these messages to ConnectMe 115 application as events. In an exemplary embodiment, the Task Manager 135 also listens to user actions and updates the task record with this action and publishes these actions to other user through the ConnectMe Handler 155.

In an exemplary embodiment, the ConnectMe Handler 155 builds ConnectMe web services requests based upon incoming object with right profile Id and makes web service calls to ConnectMe 115. In an exemplary embodiment, ConnectMe profiles are defined using the ConnectMe admin tool 70 before making these web services calls.

In an exemplary embodiment, the BPM Handler 175 is called by the BRR mobile client 105 upon printing of the overlay bag tag 45 to update ABS 60 with BPM. The BPM Handler 175 makes web services calls to ABS 60 with all the relevant information to create BPM.

In an exemplary embodiment, the Scan History Handler 180 is called by the BRR desktop client 90 on mouse over on scan data of a task. In an exemplary embodiment, a caller passes bag tag number for which scan history is being requested. The Scan History Handler 180 builds the request and makes the call to ABS 60 for the scan history using web service call. Response from ABS 60 is formatted before sending to the BRR desktop client 90.

In an exemplary embodiment, the Reroute Services 185 is called by the BRR desktop client 90 and/or the BRR mobile client 105 when a bag needs to be rerouted on a different flight than the passenger. The Reroute Services 185 calls Common Services 210 web services to get a list of alternative flights on which the bag can be sent and provides these options to the BRR desktop client 90 and/or the BRR mobile client 85. Upon selecting a flight from the list by displayed on the BRR desktop client 90 and/or the BRR mobile client 85, the Reroute Services 185 is called again to process the reroute. For a reroute, the Reroute Services 185 makes fellow Common Services 210 web services calls: creates Change BSM; creates BPM; updates PNR remarks; creates forward message if international flight involved; and creates BTM message if OA involved.

In an exemplary embodiment, the OnHand Handler 170 is called to process bags onhand. This OnHand Handler 170 calls Onhand web services of Common Services 210 by building the request based upon the information that is passed by the BRR desktop client 90 and/or the BRR mobile client 85 for OnHand functionality. In an exemplary embodiment, the BRR desktop client 90 and/or the BRR mobile client 105 pass the bag tag number, bag description, name of the agent handling the bag and location information.

In an exemplary embodiment, the BRR desktop client 90 registers with ConnectMe 115 to receive tasks upon login. In an exemplary embodiment, BRR desktop client 90 lists tasks that need manual handling upon login and selecting region and/or airline. In an exemplary embodiment, BRR desktop client 90 also acts as a monitoring tool. The user is able to take action on each of the tasks and track the task status. Each of the user actions is recorded in the database 40 by calling the Task Manager 135. In an exemplary embodiment, BRR desktop client 90 provides three options of actions for open tasks, which are Assign Task, Print Overlay, and Reroute. In an exemplary embodiment, the Assign Task option assigns selected task/s to available handlers. Alternatively, tasks can be sent to ConnectMe 115 to send to respective handlers. In an exemplary embodiment, the Print Overlay option selection from options available calls the BPM handler 17 to generate BPM along with printing bag tag using a printer connected to that computer. In an exemplary embodiment, if a flight that needs to carry the bag has already left, then the reroute option is selected find alternate flight options to reroute the flight. In an exemplary embodiment, reroute options are provided by Reroute Services 185 upon selecting reroute option. Upon selecting a flight this component calls Reroute Service 185 component to process the new route.

In an exemplary embodiment, the BRR mobile client 105 registers with ConnectMe 115 to get the interested tasks. In an exemplary embodiment, the user is able to see tasks as a list or can filter by flight. In an exemplary embodiment, BRR mobile client 105 shows task details upon selecting a task. Additionally, BRR mobile client 105 reads bag tag scan data upon scanning the original bag tag 10 and/or the overlay bag tag 45 and identifies a task in the list of tasks that are stored in local storage. If a record is found, it calls the printer plugin to print the overlay bag tag 45. In an exemplary embodiment, BRR mobile client 105 is also responsible to call BPM Handler 175 to make web service call to ABS 60 to create BPM. In an exemplary embodiment, the BRR mobile client 105 also calls Reroute Service 185 to get alternate flight options in case a flight that needs to carry the bag is already departed. Once an alternate flight is selected, BRR mobile client 105 makes web service call to Common Services 210 to create change BSM, BTM if OA involved through Reroute Services 185. In an exemplary embodiment, BRR mobile client 105 also adds remarks to PNR by calling Common Services web services. In an exemplary embodiment, Scanner Plugin handles the barcode scanning functionality of the mobile device 25. Device software is used to connect to an external scanner and a barcode scan result is processed by this plugin. In an exemplary embodiment, a Bluetooth Print Plugin component makes the mobile device 25 connect to a Bluetooth printer over Bluetooth and sends the data that is to be printed to the connected printer.

Figure 7:
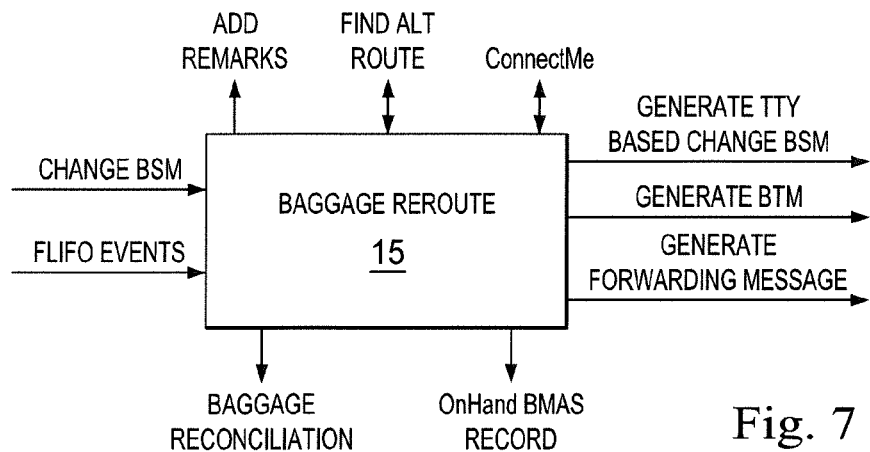
FIG. 7 is another data flow diagram of the system of FIG. 2, according to an exemplary embodiment.

In an exemplary embodiment and as illustrated in the data flow diagram of FIG. 7, data inputs to BRR 15 include a change BSM, FLIFO events, data from ConnectMe 115, and Find alt route are inputs. In an exemplary embodiment, data output of BRR 15 include Add Remarks, Find alt route, data to ConnectMe 115, generate TYY based change BSM, Generate BTM, Generate forwarding msg, Onhand BMAS record, and Baggage reconciliation.

Figure 8B:
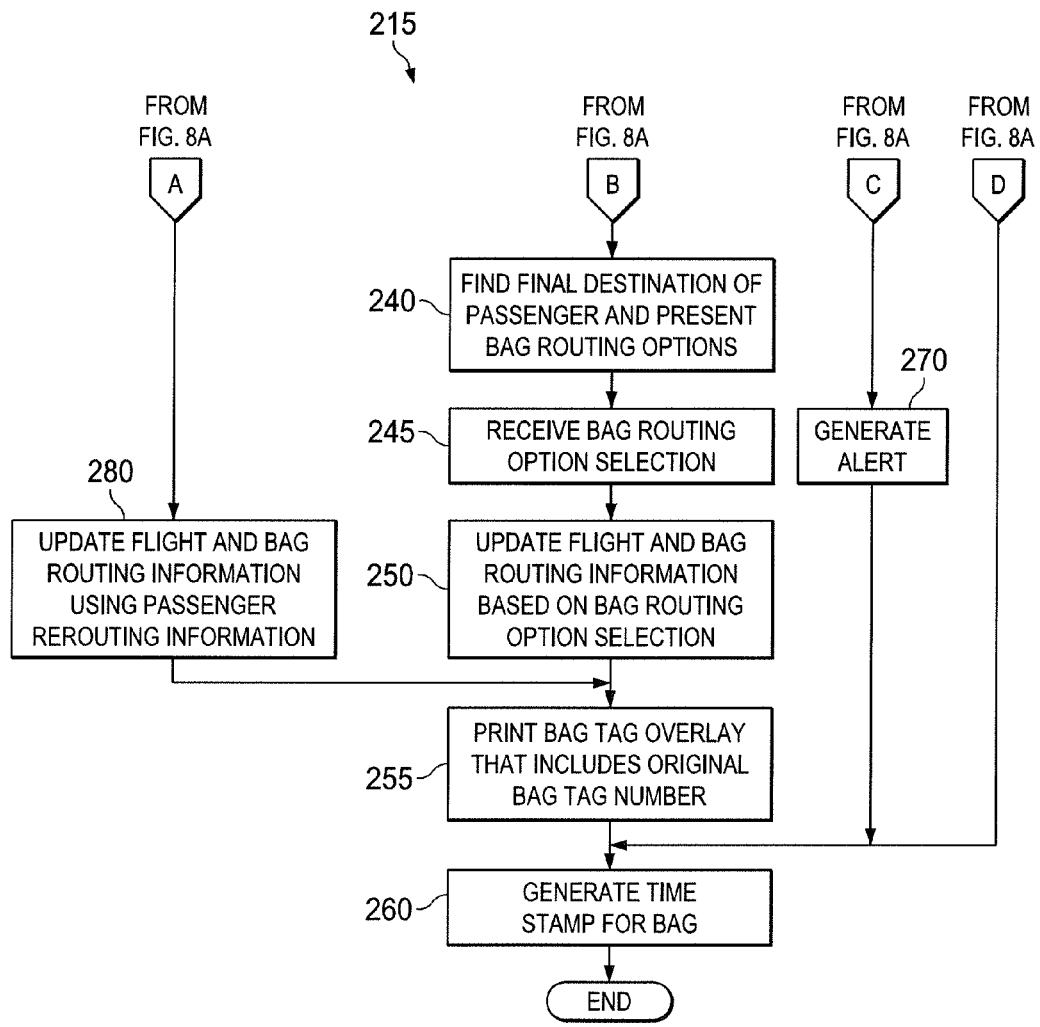

In an exemplary embodiment, as illustrated in FIGS. 8A and 8B with continuing reference to FIGS. 1-5, 6A-6D, and 7, a method of rerouting a bag, by operating BRR 15, is generally referred to by the reference numeral 215. In an exemplary embodiment, the method 215 includes scanning the bag tag 10 associated with the bag at step 220; identifying the bag tag number, passenger routing information, and passenger bag routing information that is associated with the bag tag 10 at step 225; and determining if the passenger has been rerouted at step 230. If the passenger has been rerouted, then the method 215 includes determining if the passenger has departed on a flight without his or her bag at step 235. If the passenger has departed on a flight without his or her bag at step 235, then the method 215 includes finding the final destination of the passenger and presenting bag routing options selections to a user at step 240; receiving bag routing option selection at step 245; updating the flight and bag routing information based on the bag routing option selection at step 250; printing the bag tag overlay 45 that includes an original bag tag number at step 255; and generating a time stamp for the bag at step 260. However, and returning to the step 235, if the passenger has not departed on a flight without his or her bag, then the method 215 further comprises determining whether there is a high risk of the bag missing a scheduled flight that forms a portion of the travel itinerary at step 265. If there is a high risk of the bag missing the scheduled flight that forms a portion of the travel itinerary at the step 265, then the method 215 further comprises generating an alert at step 270 and the next step is the step 260. If there is not a high risk of the bag missing the scheduled flight, then the next step is the step 260. Returning to the step 230, if it is determined that the passenger has been rerouted, then the method 215 further comprises determining whether the passenger departed on a flight that forms a portion of an updated itinerary without the bag at step 275. If the passenger has departed on the flight without the bag, then the next step is the step 240. If the passenger has not departed on the flight without the bag, then the method further comprises updating the flight and bag routing information using the passenger rerouting information at step 280 and the next step is the step 255.

At the step 220, the mobile device 25 scans the bag tag 10 associated with the bag.

In an exemplary embodiment, a bag itinerary is considered invalid if the passenger has been rerouted at the step 230, if the passenger has departed on a flight that forms a portion of the updated itinerary without the bag at the step 265, and if the passenger has departed on a flight that forms a portion of an original itinerary without the bag at the step 235. Thus, the bar itinerary is considered invalid if a task is stored in the cache of the mobile device 25 that is associated with the bag tag number identified by the mobile device 25 upon scanning the original bag tag 10.

In an exemplary embodiment, in response to the bag being scanned by the mobile device 25, data is received by the mobile device 25 and the BRR mobile client 105 identifies the bag as a "reroute," "current," "forward," or "hold" based on a bag status in the device cache. When the bag is scanned BRR mobile client 105 looks for the scanned bag tag number in the device cache. In an exemplary embodiment, the BRR mobile client 105 keeps a cache of the live, or open, rerouted baggage tasks and updates. If a bag tag number is found in the cache, then the BRR mobile client 105 identifies the scanned bag as a reroute candidate and provides additional details for the bag. Thus, searching the cache of the mobile device 25 using the scanned original bag tag number determines whether the customer has been rerouted and whether the passenger has departed on the flight without the bag.

At the steps 250 and 280, and in an exemplary embodiment, updating flight information may include increasing the bag count and/or bag weight for the aircraft associated with the new route and decreasing the bag count and/or bag weight for the aircraft associated with the original, or old, route.

At the step 265, and in an exemplary embodiment, whether there is a high risk of the bag missing a scheduled flight may be based on how many minutes are remaining until the scheduled flight departs.

At the step 270, and in an exemplary embodiment and when an alert is generated, the alert may include information regarding the amount of time remaining in which the bag must arrive at the aircraft in order to "catch" the flight; the aircraft terminal or otherwise the location of the aircraft, etc.

In an exemplary embodiment, a "print overlay" action makes a web service call to process REROUTE_SCAN BPM with reroute bag details along with scan time and scan location. This web service ("WS") resides in the web application which takes this request and parses data to build BPM message that can be sent to ABS 60 on MQ. Once ABS 60 receives this message, it updates the BPM information in the database 40 (bag_details table) and also pushes this scan data to the BRR application 75. In an exemplary embodiment, the BRR application 75 updates this information in the database (baggagere_reroute_task table) and also updates the active users with BPM. If the user selects the back button, then TRACKSCAN status is recorded. The above-mentioned steps apply for the "current" bag option. If the user scans a bag and BRR mobile client 105 identifies it as the "forward" candidate based on cache data, then the user is presented with forward options with bag details. When forward option is selected, process forward WS is called with FORWARD_SCAN status. This updates the ABS database with forward BPM and also gets pushed to the BRR application 75. The BRR application 75 updates this information in the database 40 and also pushes this scan status update to ConnectMe 102, which in turn updates the active users. In the case of a "forward" bag, if the user selects "back", then TRACKSCAN is recorded. If the user scans a bag tag using the mobile device 25 and the device does not find the bag tag number in the cache, then a WS call is made to get the bag details. Once details are retrieved, the device shows the bag details to the user as a current bag and provides the user with the option to Forward, Hold or Complete. If the user selects Hold option then a WS call is made to process BPM with REROUTE_HOLD as status along with bag details. This processes the BPM the same way as other scan status. Also this creates a HOLD record in the BRR database (Baggage_reroute_task table). This record is pushed to ConnectMe 115 so that both desktop and handheld can show hold task under hold tab. In the above case, if the user selects "Complete" option after looking at the bag details, then TRACKSCAN is recorded and no hold record is created. If the user selects OnHand option from BSO menu, then the user is provided with onhand screens. The user can scan chart to input the bag type, color, and description and bag tag. This screen provides OnHand or back option. When user selects OnHand option, based on the user information a WS processes BIS onhand, full OnHand or close OnHand. It also processes BPM with BSO_ONHAND OR BSO_CLOSE_ONHAND scan status. When the user selects Complete or back option a TRACKSCAN BPM gets recorded without creating or closing OnHand.

Figure 9:
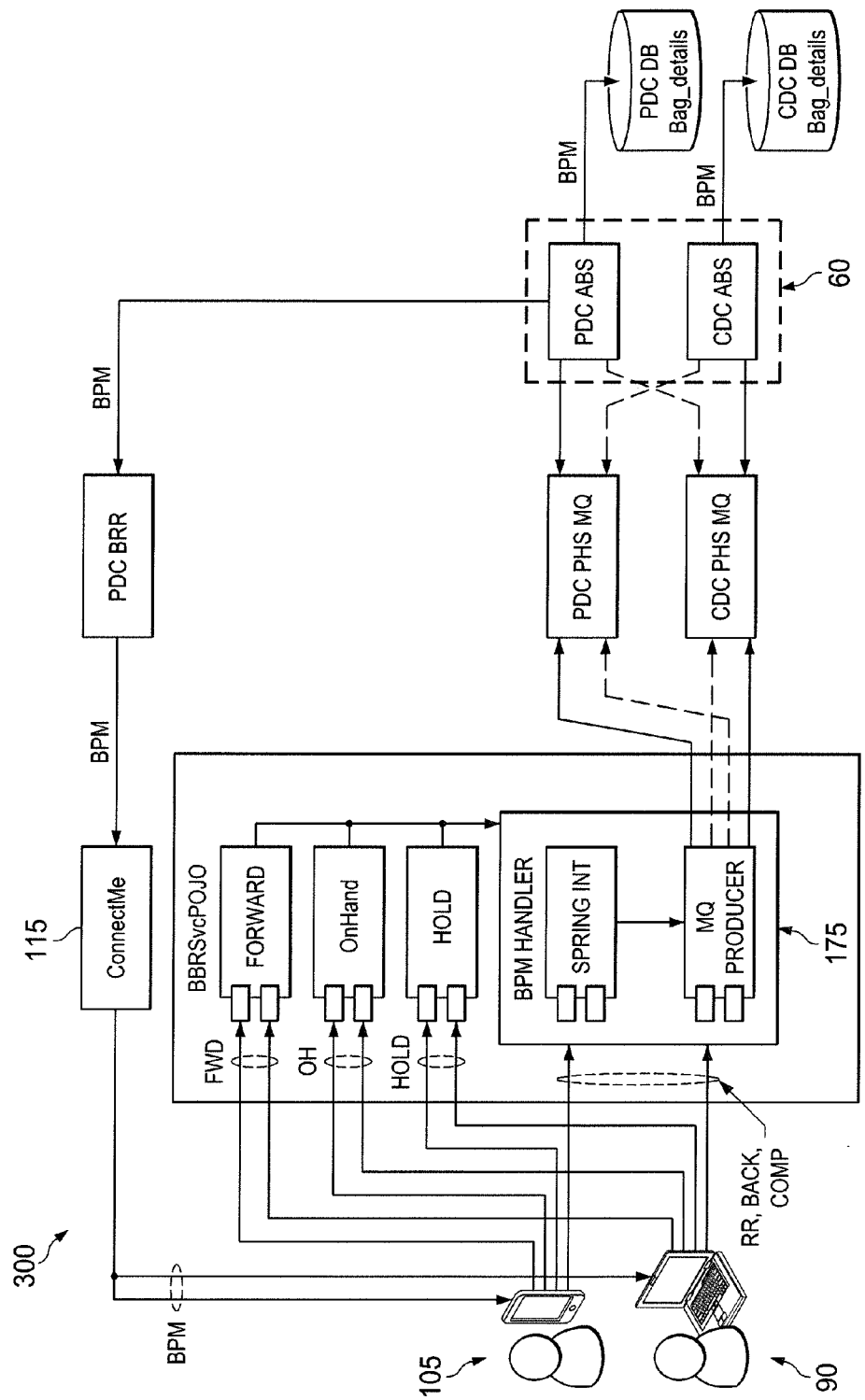
FIG. 9 is a component diagram of the system of FIG. 2, according to an exemplary embodiment.

FIG. 9 illustrates a BRR BPM process component diagram that is generally referred to by the reference numeral 300. In an exemplary embodiment, the BRR desktop client 90 and/or the BRR mobile client 105 calls the BPM WS Handler 175 upon bag tag print to update ABS 60 with BPM. The BPM WS Handler 175 makes web services call to ABS 60 with all the relevant information to create BPM. In an exemplary embodiment, BRR BPM processing traces each of the "touch points" of a bag so that the bag can be easily traced. This may also help to measure efficiency of BRR 15 through reporting. In an exemplary embodiment, these BPM messages are sent to the ABS application where these messages are recorded and some or all of the information is pushed to BRR application 75 along with other applications which are interested in BPM. In an exemplary embodiment, the touch points may be: RR_TRACKSCAN BPM is recorded when a bag is scanned by the mobile device 25 to proactively reroute a bag and an overlay tag gets printed; REROUTE_SCAN BPM is recorded when the bag is scanned by the mobile device 25 to proactively reroute the bag and print the overlay bag tag 45, to indicate that this bag has been processed for reroute by BRR application 75; TRACKSCAN BPM is recorded when a reroute bag is scanned by the mobile device 25 and BRR 15 brings forward options as new flight has departed and user opts to cancel/go back from forward processing; TRACKSCAN BPM is recorded when the bag is scanned by the mobile device 25, there is no matching reroute record, and user selects an "OK" option after looking at the baggage details when current baggage details along with FORWARD and OK options are displayed; FORWARD is recorded when the bag is scanned by the mobile device 25, there is no matching reroute record, and the user selects a "FORWARD" option after looking at baggage details when current baggage details along with FORWARD and OK options are displayed; HOLD is recorded when the bag is scanned by the mobile device 25, there is no matching reroute record, and the user is selects a "HOLD" option after looking at bag details when current bag details along with FORWARD, HOLD and OK options are displayed to the user; BSO_ONHAND BPM is recorded when the bag is scanned by the mobile device 25 to creating OnHand record; BSO_CLOSE_ONHAND BPM is recorded when the bag is scanned by the mobile device 25 to close OnHand records; TRACKSCAN BPM is recorded when the user chooses to go "back" from the OnHand screen; RR_FORWARD BPM is recorded when the user is viewing the forward screen and chooses to forward the bag; and RR_FWD_TRACKSCAN BPM is recorded when the user chooses to cancel by pressing the back button while viewing the forward screen.

Figure 10:
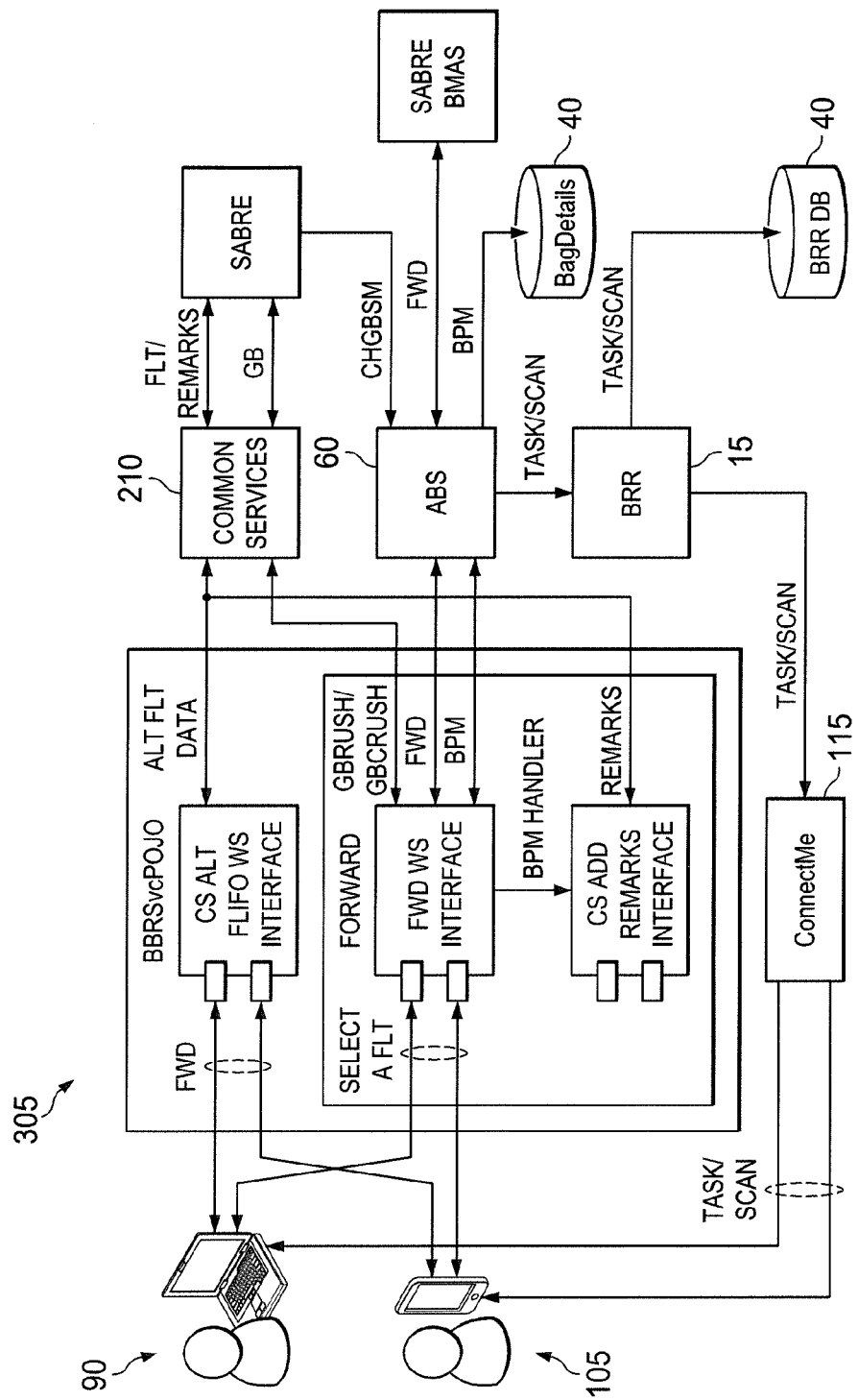
FIG. 10 is another component diagram of the system of FIG. 2, according to an exemplary embodiment.

In an exemplary embodiment, FIG. 10 depicts a "BRR Forward" component diagram generally referred to by the reference numeral 305. In an exemplary embodiment, the user is able to Forward the bag based on the flight status or events and/or add remarks to PNR process. When the user logs into BRR 15 and selects a station, then Reroute tasks specific to the logged on station are retrieved through web service and saved into Data Context. In an exemplary embodiment, the user scans the bag tag 10 using the mobile device 25. If the scanned bag tag is a reroute task, then the user interface of the mobile device 25 displays Task details 310 as illustrated in FIG. 11A, which includes along with old and new itinerary details. If the scanned bag tag is a non-reroute task, then the mobile device 25 displays Bag Tag info 315, which includes itinerary information, as illustrated in FIG. 11B. If there are any network failures, scanned bag tag data is saved in a local database. Based on user selection, the bag tag scan information is saved in a database accordingly. A background thread, BRRPollThread, is invoked when a bag tag is saved in local DB. In an exemplary embodiment, this thread checks for network connectivity in an interval of thirty seconds and try to post the bag tag information to the server through the web service. BRRPollThread is started and executed continuously unless there are no bag tag records in local to be processed. The user scans a bag tag and can FORWARD a bag tag. The bag scanned may be a reroute or a non-reroute task. Based on the task, bag tag details are updated in server through web service calls. The user selects the Forward option in the bag details screen where the user is launched with list of flight selection screen 320 as illustrated in FIG. 11C. This screen lists the available flights depending on the origin and destination city values. In an exemplary embodiment, the user selects an appropriate flight and forwards the bag. The user also has an option of selecting next day flight or Other Airlines to forward the bag. Depending on the selection, the bag forward information is stored in the server. In exemplary embodiment, the flow of events may include: the user logs into BRR 15; the user is shown Baggage Reroute Main Menu; the user clicks on Reroute menu icon and navigates to printer/work area selection screen; the user navigates to next screen after selecting/skipping the printer selection; the user scans a bag tag using the mobile device 25; the user views the details of the bag tag information retrieved from the server 30; the user selects a FORWARD option from the bag tag details information; and on selecting FORWARD option, scan status is updated in the server 30; and in case if there are any network failure, the bag tag information is saved in local DB and pushed to the server 30 through Polling.

Figure 12:
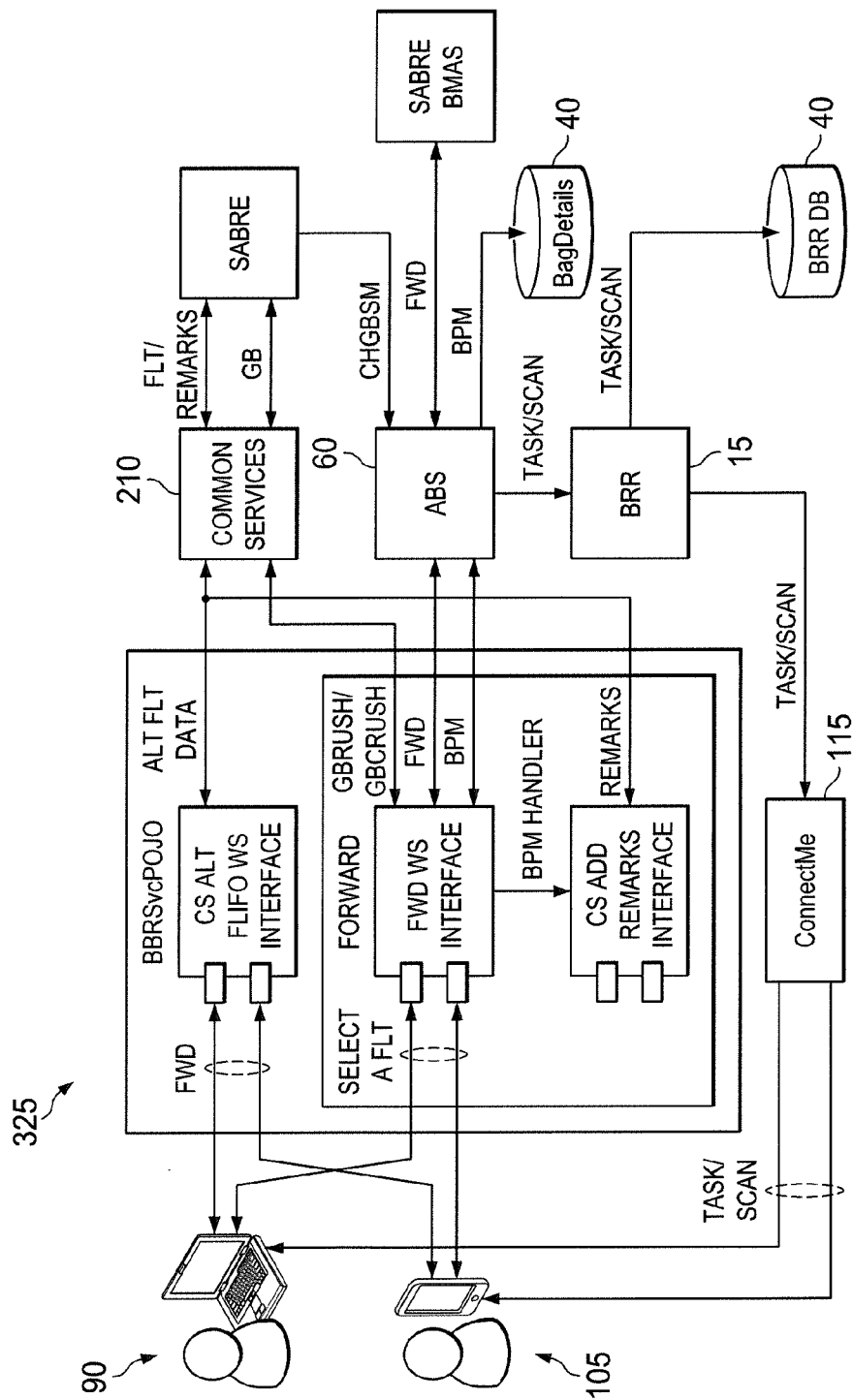
FIG. 12 is yet another component diagram of the system of FIG. 2, according to an exemplary embodiment.

In an exemplary embodiment, FIG. 12 depicts a component diagram relating to adding remarks to PNR and is generally referred to by the reference numeral 325. In an exemplary embodiment, PNR is updated with remarks in SABRE when the bag is forwarded or rerouted by BRR 15. In an exemplary embodiment and based on the task, bag tag details are updated in the server 30 through web service calls. Upon successful forwarding of the bag, BRR 15 adds a remark to the PNR through Common Service 210 web service. Also when a successful reroute occurs, the BRR application 75 adds a remark to PNR. When the user of the BRR mobile client 105 or the BRR desktop client 90 selects the forward option, then a web service call is made to get alternative flight schedule from BRR web application 75 which in turn makes a call to Common Services 210 CSSearchWS web service and returns all the possible alternative flight options to user. Once the user selects one of the options for alternative flight, selects ok, then a forward request is made to the BRR web component. This request in turn makes a forward web service call to ABS 60. Upon successful ABS forward process, add remark service is called which is a web service call to Common Services 210. Once this is successful, a GBRUSH or GBCRUSH message is sent to Sabre via CS web services and GBCRUSH generates CHG BSM and pushes to respective stations and ABS 60. GBRUSH creates bag tag and pushes BSM to respective stations and ABS 60. In an exemplary embodiment, Update BPM web service of ABS 60 is called once that is successful and a success response is returned to the user. In an exemplary embodiment, Update BPM request to ABS 60 also updates BRR 15 with BPM. BRR 15 in turn updates the BRR table in the database 40 and pushes this BPM information to ConnectMe 115. ConnectMe 115 then pushes this data to all the logged in users. When the user of the mobile device 25 reroutes a bag, upon successful printing of the overlay bag tag 45, the mobile device 25 in turn calls web service calls and updates BRR server 30 that is processed the reroute. After receiving information, adds remarks to PNR though Common Service 210 web service.

Figure 13:
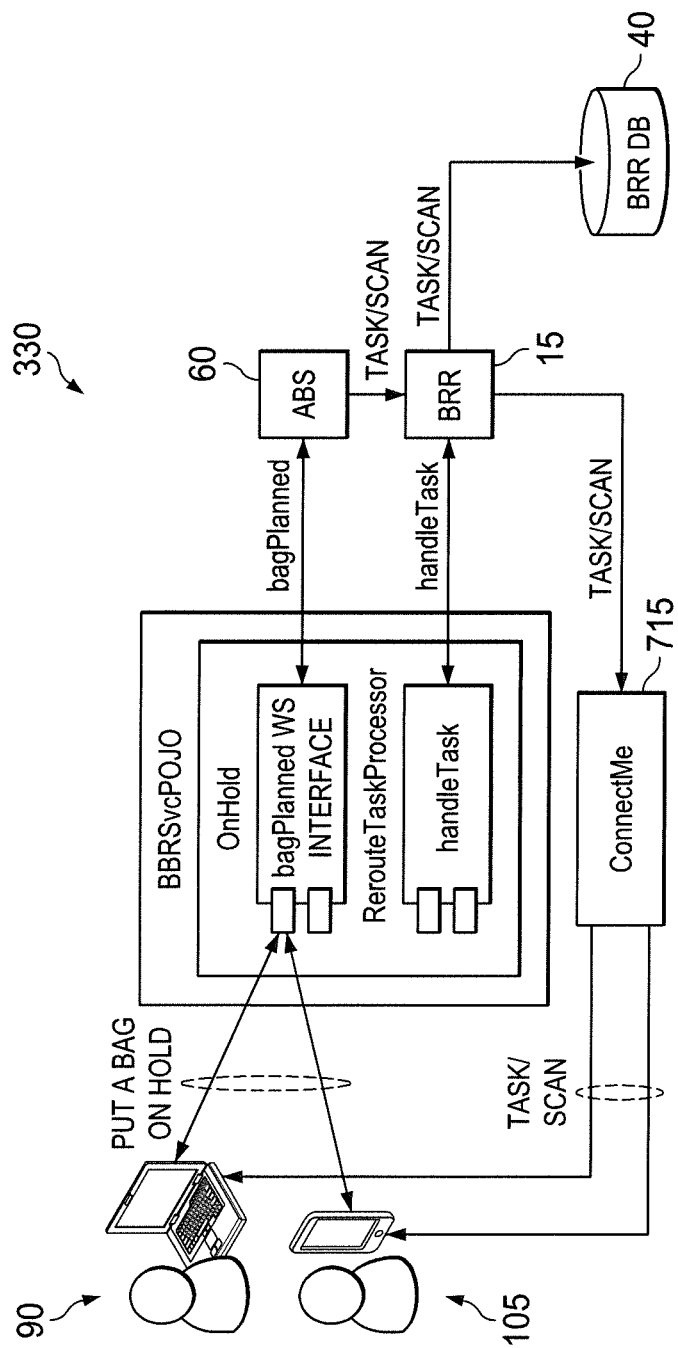
FIG. 13 is yet another component diagram of the system of FIG. 2, according to an exemplary embodiment.
Figure 14A:
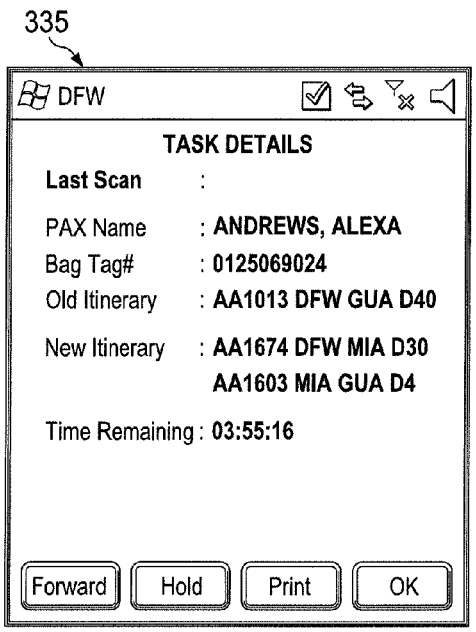
FIGS. 14A and 14B are diagrammatic illustrations of a user interface of the mobile device of FIG. 2, according to an exemplary embodiment.
Figure 14B:
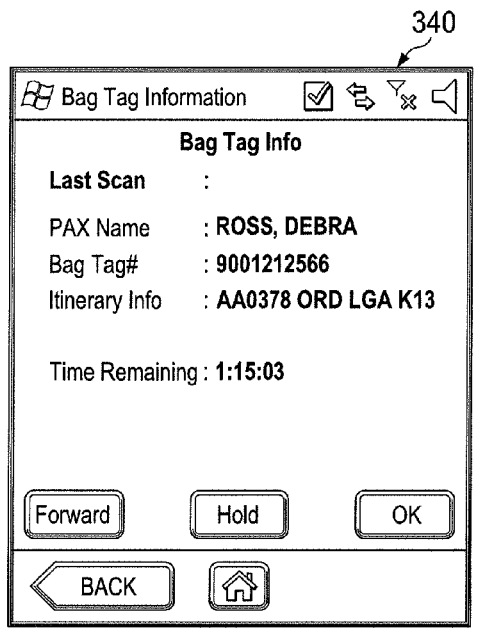

FIG. 13 illustrates an Onhold process that is generally referred to by the reference numeral 330. In an exemplary embodiment, the user is able to put a bag on hold irrespective of whether it is a reroute bag or not. In an exemplary embodiment, if the bag is not a reroute bag, once it is put on hold, it is visible in the BRR mobile client 105 and/or the BRR desktop client 90 as an "on hold" bag. In an exemplary embodiment, a bag can be put on hold using either mobile device 25 or the desktop computer 20. In the mobile device 25, when the user logs into BRR 15 and selects a station, then Reroute tasks specific to logged on station are retrieved through web service and saved into Data Context. The user scans a bag from the mobile device 25. If the scanned bag tag is a reroute task, then the user is displayed with Task Details 335 along with old and new itinerary details as illustrated in FIG. 14A. If the scanned bag tag is a non-reroute task, then the user is displayed with Bag Tag info 340 with itinerary information as illustrated in FIG. 14B. In an exemplary embodiment, the user scans the bag tag 10 and can either HOLD or FORWARD a bag tag. Baggage Scanned may be a reroute or a non-reroute task. Based on the task, bag tag details are updated in server through web service calls. User can select the HOLD option based on which the bag information of the current bag tag is updated in the server 30. In an exemplary embodiment, a flow of events may include: the user logs into BRR 15; the user is shown Baggage Reroute Main Menu; the user clicks on Reroute menu icon and navigates to printer/work area selection screen; the user navigates to next screen after selecting/skipping the printer selection; the user scans a bag tag from the mobile device 25; the user gets the details of the bag tag information retrieved from the server; the user can either select HOLD or FORWARD option from the bag tag details information; on selecting HOLD option, scan status is updated as HOLD_SCAN and the scanned information is pushed to server; and in case if there is network failure, user is prompted with confirmation Hold a bag or not. Based on the selection, the bag tag information is saved in local DB and pushed to server through Polling. In an exemplary embodiment, BRR 15 allows the status of a large number of bags to be updated to "hold" within a very short amount of time. For example, when a flight is delayed or cancelled, the bag scheduled to depart on the flight may be located in one small area, such as for example a loading area or on a bag truck. In that case, the user of the mobile device 25 scans each of the bag tags to update its status to "hold."

Figure 15:
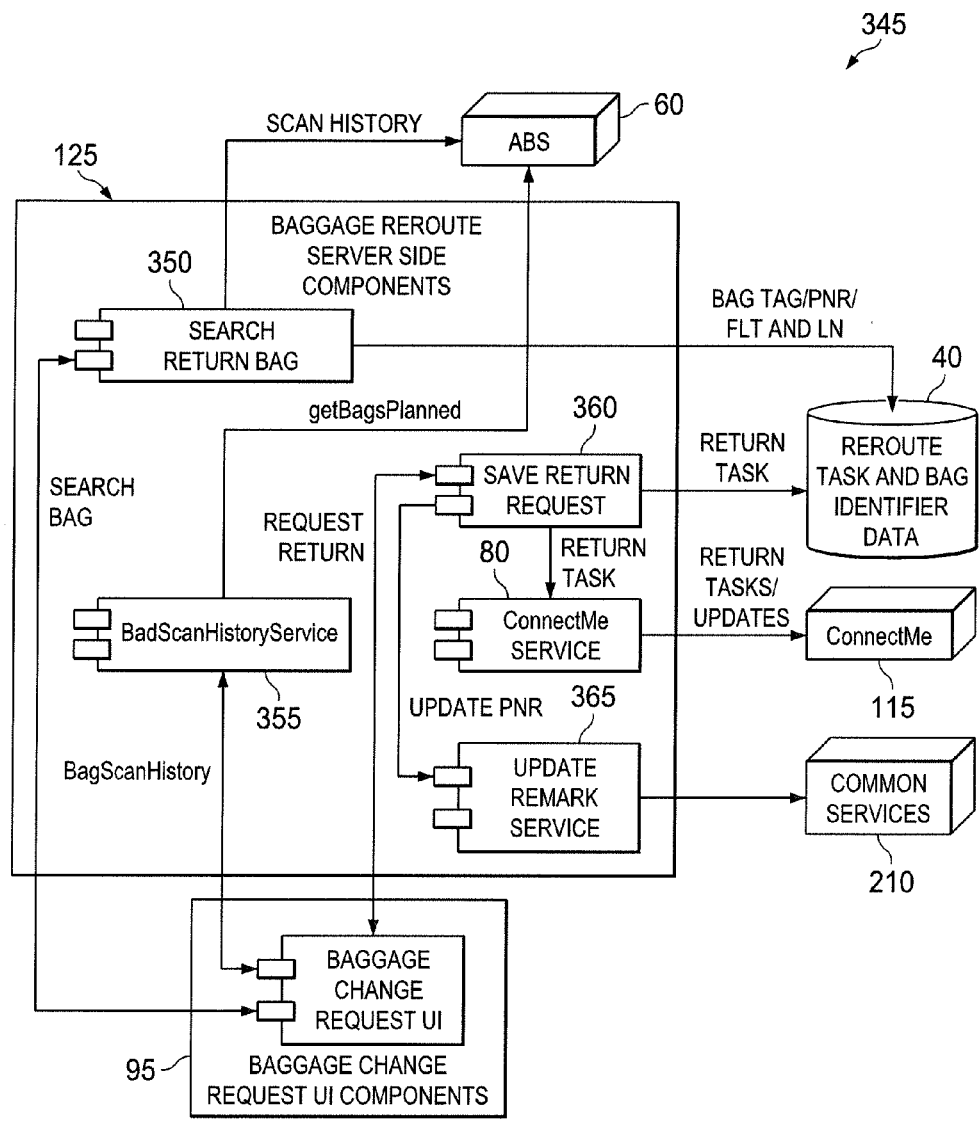
FIG. 15 is yet another component diagram of the system of FIG. 2, according to an exemplary embodiment.

In an exemplary embodiment, FIG. 15 depicts a component diagram that is generally referred to by the reference numeral 345 in which the components 125 also include a Search Return Bag component 350, a Bag Scan History Service 355, a Save Return Request 360, the ConnectMe Service 80, and an Update Remark Service 365. In an exemplary embodiment, the Search Return Bag component 350 takes return bag search inputs along with the station to look for a matching bag in the database 40. If found, then it sends the bag tag details along with bag status to the caller, which calls getBagsPlanned WS with return bag search fields. In an exemplary embodiment, a hibernate first level caching mechanism is used for caching already searched bag tags. In an exemplary embodiment, the Bag Scan History Service 355 obtains bag scan history by calling getBagScanData WS in ABS 60 using bag tag and date. This returns formatted scan history information to the caller. In an exemplary embodiment, the Save Return Request 360 component requests a new task, if a task is not present in the database 40. If a task is already present, it updates the task with return status and current status as requesting station. The Save Return Request 360 components also saves bag identifier information in a separate table with associations to a task table with task sequence number as a foreign key with a status of the saved action being sent to Save Return Request 360. In an exemplary embodiment, ConnectMe Service 80 is called when Save Return Request 360 saves a return request task successfully to push the return task to respective stations. In an exemplary embodiment, the Update Remark Service 365 updates PNR with return request information as SBAG-BCO user <id> request return of <bat tag> at <time>. In an exemplary embodiment, the Push Scan Data Service component sends a Return Request and Complete BPM to ABS 60 once action is taken. In an exemplary embodiment, sending BPM and update remarks are processed asynchronously using spring integration queues. BRR desktop client 90 acts as a client to search a bag tag to request, return, or to check the status of the return request. In an exemplary embodiment, BRR 15 includes a Baggage Change Order ("BCO"), which requests return of bag to a specific location and monitors the status of the request. This BCO request is made when there is a change in the passenger travel plan and the passenger is requesting the return of the bag that was checked in for the originally planned travel. In an exemplary embodiment, BCO is a desktop application that is used by agents to request return of the bags. In an exemplary embodiment, when a BCO user searches for a bag to request return on a BCO page, the user either searches with 10 digit bag tag number and/or PNR or with flight number and last name. In both cases and in an exemplary embodiment, BRR 15 first searches in BRR 15 for the bag with search fields along with logged in user station. If not found, then BRR 15 looks for the bag in ABS 60 with search fields. When matching bag tag is found in BRR 15, BRR 15 identifies the status of the bag as bag tag can have return status already. When a bag is found in BRR 15 with reroute status for user search, requester is presented with bag tag details such as passenger name, PNR, bag priority, new routing along with bag scan history. The user is also presented with a bag identifier input form with bag type, color, return location and comments section for any additional information. In an exemplary embodiment and when the bag tag is found in BRR 15 with return status for the same station, the user is presented with bag tag details and bag scan history along with bag identifier section with edit option so that user can update the request information. When the bag tag is not found in BRR 15, then BRR 15 checks ABS 60 for bag information by calling bagsPlanned WS. If information is found, then the user is presented with bag tag information and bag scan history along with form to provide bag identifier information to request the return of the bag. When bag information is not found in both BRR 15 and ABS 60, then the user is presented with the input form to provide additional information related to bag such as passenger name, PNR, bag priority, routing along with bag identifier. In an exemplary embodiment, bag scan history is pulled from ABS 60 by calling getBagScanData WS with bag tag and date information. In an exemplary embodiment, once a form is submitted with return request information, BRR saves the bag identifier information in a separate table with bag task sequence number as foreign key to associate bag identifier to a bag tag.

Figure 16:
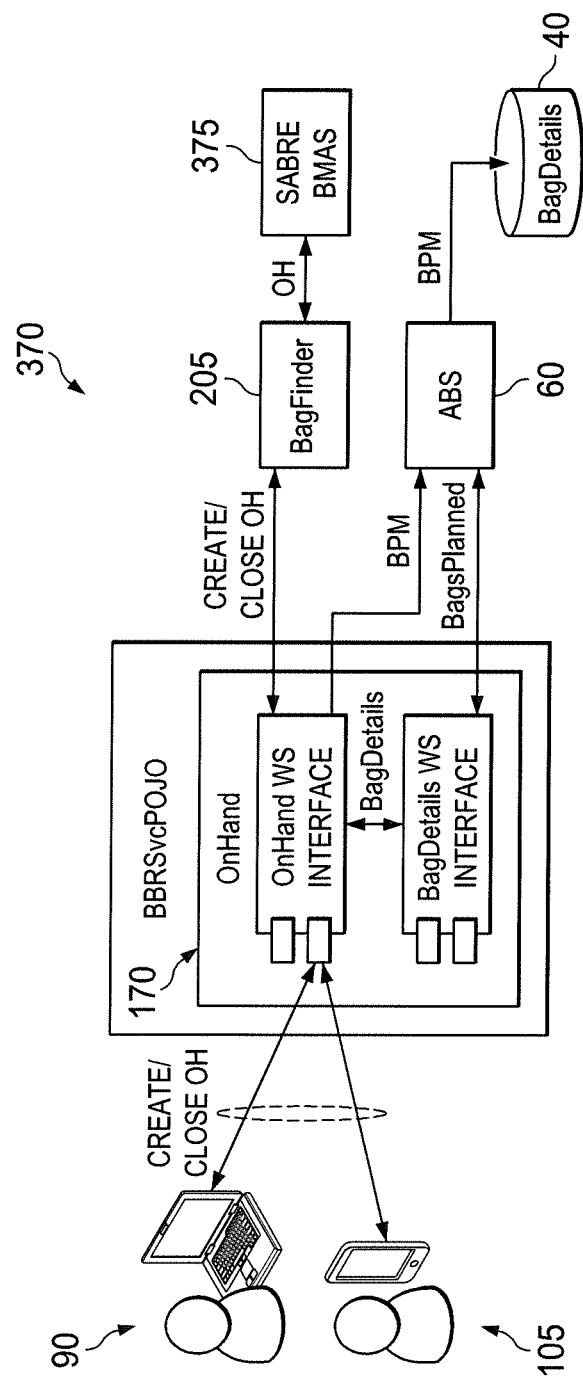
FIG. 16 is yet another component diagram of the system of FIG. 2, according to an exemplary embodiment.

In an exemplary embodiment, an OnHand process is generally referred to by the reference numeral 370 in FIG. 16. BRR 15 provides the user of BRR 15 to create an On Hand record for the bag. In an exemplary embodiment, the user may Create BIS On Hand, Full On hand and Close On Hand record based on the functional parameters like bag color, type, description, etc. In an exemplary embodiment and when a bag is not claimed by a passenger in their destination city after 90 minutes, then the bag is put OnHand in Sabre BMAS system 375 so that the bag can be traced by anyone who is looking for the bag. This functionality is made available through BRR 15. This service updates the record with additional description and remarks when provided. When a passenger claims a bag that has been put OnHand, the onhand file is closed. In an exemplary embodiment, a flow of events may include: the user logs into BRR 15; the user is shown Baggage Reroute Main Menu; the user clicks on OnHand menu icon and On Hand user entry screen; the user can also manually enter the appropriate code in the provided textbox; the user can also enter additional information like Carrier code, location1 and location 2 in the On Hand entry screen; and based on the details, on hand information is posted to server through web service calls and the user is alerted accordingly if the process is successful or not. In an exemplary embodiment, three types of On Hand and the parameters that are required for each On Hand type, which are BIS On Hand-Bag Tag number is mandatory; Full On Hand-Bag Tag number, Type, Color or description is mandatory; and Close On Hand-Bag Tag number is mandatory. In an exemplary embodiment, the BRR mobile client 105 or the BRR desktop client 90 makes a "create OnHand" request to the BRR web component, which in turn calls BRRSvcPOJO application to process the create OnHand. Once this request is received, the OnHand Handler 170 makes a BagsPanned web services calls to ABS 60 with bag tag, same id and station that user logged in. In an exemplary embodiment, the request from the BRR mobile client 105 or the BRR desktop client 90 also sends following optional fields bag color, type, description and location information. In an exemplary embodiment, if the bag color is present in the request, then the type is required. In an exemplary embodiment, and from BagsPanned WS response destination station, airline code, passenger first and last name, PNR and equate code are extracted to build full on hand request. Once this request is successful then processBPM request is sent to ABS 60 which updates the dag details table in the database 40 with BRR_ONHAND scan status. In an exemplary embodiment, if BagsPanned WS return without bag details then OnHand Handler 170 return to requested with error message saying unable to find the requested bag details, provide below required field to create BIS OnHand which asks user to input airline code and destination station. Once this information is provided OnHand Handler 170 builds onhand WS request with minimum information available i.e. bag tag, destination city, airline code, control station and same id. Upon successful creation of BIS OnHand a processBPM call is made that updates ABS 60 with BRR_ONHAND scan status to ABS 60. When a request is made with close status as true then same bagsPlanned WS is called to collect airline and destination station. In an exemplary embodiment, and with this information along with logged in user station and same id, close OnHand request is made to BagFinder 205. Upon successful completion, processBPM call is made, which updates ABS 60 with BRR_ONHAND_CLOSE scan status and then a success response is returned to the requester. In an exemplary embodiment, and in case for a close OnHand request, a response returned says record already closed then same response is returned to the requester.

In an exemplary embodiment, BRR 15 prints the bag tag overlay 45 that includes the original bag tag number 10*b*. In an exemplary embodiment, BRR 15 provides the user with an option of printing the overlay bag tag 45 for a reroute task. In an exemplary embodiment, the user can look up a task either by scanning a bag tag or manually entering a bag tag number. The printed bag tag overlay 45 can be put over the bag tag 10 so that bag is routed appropriately. When the user scans the bag tag 10 or manually enters a bag tag number 10*b*, BRR 15 searches for the bag tag number in the DataContext object. If the bag tag number 10*b* is found in the reroute task data stored in the datacontext, the user is navigated to the task details screen and the task details are shown along with Print and Ok buttons. In an exemplary embodiment, the user may select to print the overlay bag tag 45 via Bluetooth printer. In an exemplary embodiment, a flow of events may include: the user logs into BRR 15; the user is shown Baggage Reroute Main Menu; the user clicks on Reroute menu icon and navigates to printer/work area selection screen; the user selects work area and scans printer address (or the user may choose to skip these fields); the user scans the bag tag 10 or selects "search bag tag" menu and manually enters the bag tag number; if the bag tag number is found in the application memory, the user is shown with TASK DETAILS screen with print button; the user selects to print the overlay tag on the TASK DETAILS screen; and after successful printing of the overlay bag tag 45, the user selects complete button in the task details screen. In several exemplary embodiments, the original tag number 10*b* is included on the bag tag that is scanned by the BRR application 75. The original tag number 10*b* is associated with passenger information and may be included in the bar code 45*a* that forms a portion of the bag tag overlay 45. When the BRR application 75 prints the bag tag overlay 45, the bag tag overlay 45 retains the original tag number 10*b* but includes new routing information 45*d*. This allows for the overlay bag tag 45 to quickly identify the passenger associated with the bag when the bar code 45*a* is later scanned by BRR 15. Moreover, the creation of a new bag tag number is unnecessary. Thus, data associated with a new tag number is not created and BRR 15 requires less memory than required if the bag tag overlay 45 included a new tag number. This in turn, may improve the functioning of the computer system itself and/or require fewer physical computer components. Fewer physical components may also result in less required storage space for the physical computer components, less air conditioning to cool the components, etc. The use of the old tag number or original tag number with the use of the new routing information results in better performance of the BRR 15. Additionally, using the original bag tag number on the bag tag overlay 45 results in faster computation time when trying to identify the passenger that is associated with the bag. Moreover, using the original bag tag number on the bag tag overlay 45 results in faster computation time when trying to identify the route of the bag. Thus, BRR 15 improves the functioning of the system and/or a computer itself. In an exemplary embodiment, BRR 15 results in an improved bag tag overlay 45 that improves the technology or technical field of bag routing and rerouting.

In an exemplary embodiment, the addition of the original bag tag number on the bag tag overlay 45 is an unconventional step in the field of baggage rerouting, as the current industry standard is to generate a new bag tag that does not include the customer information (i.e., omits information identifying the customer) or to write by hand new itinerary information on the original bag tag.

In several exemplary embodiments, systems and methods according to respective exemplary embodiments implement an application for processing passengers and bag associated with passengers, specifically a system and method for checking in passengers and/or their bag before the passengers' travels. In several exemplary embodiments, such a system may be referred to as "YADA." In several exemplary embodiments, one or more exemplary embodiments of such system, or YADA, may be described and illustrated in whole or in part in U.S. application Ser. No. 12/752,625, filed Apr. 1, 2010, the entire disclosures of which are hereby incorporated herein by reference.

In several exemplary embodiments, systems and methods according to respective exemplary embodiments implement an application for one or more airlines capable of supporting all event logging requirements, and connect to non-TPF-based flight operations applications via a message handling system, and are compatible with existing and planned hardware and flexible to allow for expansion if required. In several exemplary embodiments, such a message handling system may be referred to as "Flight Hub." In several exemplary embodiments, one or more exemplary embodiments of such a message handling system, or Flight Hub, may be described and illustrated in whole or in part in U.S. application Ser. No. 11/119,787, filed May 2, 2005, which issued on Dec. 11, 2012 as U.S. Pat. No. 8,332,473 to Fouts et al., the entire disclosures of which are hereby incorporated herein by reference.

Figure 17:
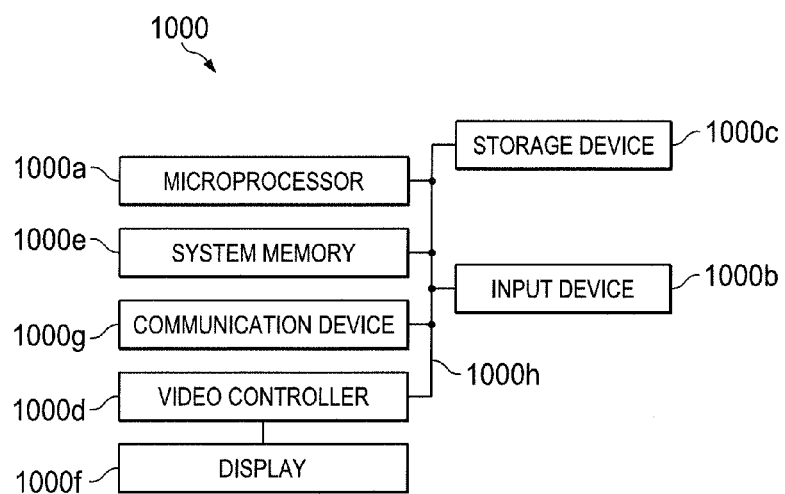
FIG. 17 is a diagrammatic illustration of a node for implementing one or more exemplary embodiments of the present disclosure, according to an exemplary embodiment.

In an exemplary embodiment, as illustrated in FIG. 17 with continuing reference to FIGS. 1-5, 6A-6D, 7, 8A, 8B, 9, 10, 11A-11C, 12, 13, 14A, 14B, 15, and 16, an illustrative node 1000 for implementing one or more of the exemplary embodiments described above, illustrated in FIGS. 1-5, 6A-6D, 7, 8A, 8B, 9, 10, 11A-11C, 12, 13, 14A, 14B, 15, and 16, and/or any combination thereof, is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several exemplary embodiments, the storage device 1000*c* may include a floppy drive, hard drive, CD-ROM, optical drive, any other form of storage device and/or any combination thereof. In several exemplary embodiments, the storage device 1000*c* may include, and/or be capable of receiving, a floppy disk, CD-ROM, DVD-ROM, or any other form of computer-readable medium that may contain executable instructions. In several exemplary embodiments, the communication device 1000*g* may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the systems described above, illustrated in FIGS. 1-5, 6A-6D, 7, 8A, 8B, 9, 10, 11A-11C, 12, 13, 14A, 14B, 15, and 16, and/or any combination thereof, include at least the node 1000 and/or components thereof, and/or one or more nodes that are substantially similar to the node 1000 and/or components thereof. In several exemplary embodiments, one or more of the above-described components of the node 1000 and/or the system illustrated in FIGS. 1-5, 6A-6D, 7, 8A, 8B, 9, 10, 11A-11C, 12, 13, 14A, 14B, 15, and 16, include respective pluralities of same components.

In several exemplary embodiments, one or more of the applications, systems, and application programs described above, illustrated in FIGS. 1-5, 6A-6D, 7, 8A, 8B, 9, 10, 11A-11C, 12, 13, 14A, 14B, 15, and 16, and/or any combination thereof, include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several exemplary embodiments pulls real-time information from one or more servers, automatically refreshing with latest information at a predetermined time increment; or any combination thereof.

In an exemplary embodiment, an itinerary and or a route includes an origination location and a final destination. Often, an itinerary and or a route includes intervening locations between the origination location and the final destination. When the BRR 15 is used by an airline, the locations and destinations are generally airports and a travel leg is a flight that transports the passenger from one location to another location or to a destination. Generally, an aircraft is used to transport the passenger on a travel leg.

In an exemplary embodiment, BRR 15 allows the user to search tasks by flight number. For example, when a flight has been delayed or cancelled, the bags associated with that flight may need to be put on hold, rerouted, etc.

In an exemplary embodiment, scanning the machine readable code includes taking a picture of a QR code or any other way in which a machine readable code is read by a machine.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In an exemplary embodiment, the network includes the Internet, one or more local area networks, one or more wide area networks, one or more cellular networks, one or more wireless networks, one or more voice networks, one or more data networks, one or more communication systems, and/or any combination thereof.

In several exemplary embodiments, any networks and/or one or more portions thereof may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of printing an overlay bag tag, the method including receiving, using a computer system, data associated with a first machine readable code that foams a portion of an original bag tag that is connected to a bag; identifying, using the computer system and based on the data, an original bag tag number and an original bag route; determining, using the computer system, that the original bag route is invalid; identifying, using the computer system, a new bag route when the original bag route is invalid; and printing the overlay bag tag that includes the original bag tag number and the new bag route information, wherein a second machine readable code forms a portion of the overlay bag tag. In an exemplary embodiment, determining that the original bag route is invalid includes matching the original bag tag number with any one of: a reroute task that includes the original bag tag number; and a forward task that includes the original bag tag number. In an exemplary embodiment, the reroute task is generated by the computer system in response to a change in a final destination of the bag; wherein the bag is associated with a passenger; and wherein the forward task is generated by the computer system in response to a route of the bag of deviating from the route of the passenger. In an exemplary embodiment, determining that the original bag route is invalid includes matching the original bag tag number with the forward task that includes the original bag tag number; wherein identifying the new bag route when the original bag route is invalid includes: identifying a final destination of the original bag route; and selecting the new bag route from a plurality of suggested bag routes; and wherein the final destination of the original bag route is the final destination of the new bag route. In an exemplary embodiment, receiving data associated with the first machine readable code is in response to a scan of the first machine readable code. In an exemplary embodiment, the method further includes receiving, using the computer system, data associated with the second machine readable code; wherein receiving data associated with the second machine readable code is in response to a scan of the second machine readable code; and wherein receiving data associated with the second machine readable code results in faster computation time within the computer system. In an exemplary embodiment, the method further includes receiving, using the computer system, data associated with the second machine readable code; wherein receiving data associated with the second machine readable code is in response to a scan of the second machine readable code; wherein receiving data associated with the second machine readable code improves the functioning of the computer system itself. In an exemplary embodiment, wherein receiving data associated with the first machine readable code that forms the portion of an original bag tag that is connected to the bag is in response to a scan of the a first machine readable code by a first mobile device; wherein determining that the original bag route is invalid includes matching the original bag tag number with any one of: an open reroute task that includes the original bag tag number, the open reroute task being stored in a cache in the mobile device; and an open forward task that includes the original bag tag number, the open forward task being stored in the cache; and wherein printing the overlay bag tag closes at least one of the open reroute task and the open forward task.

The present disclosure also introduces a method of identifying a bag, the method including: printing, using a computer system, an original bag tag for a bag of a passenger of an airline, the original bag tag including a first machine readable code, an original bag tag number, and original bag route; securing the original bag tag to the bag; scanning, using the computer system, the original bag tag to identify the original bag tag number and the original bag route; determining, using the computer system, whether the passenger has departed without the bag on a travel leg; wherein, when it is determined that the passenger has departed without the bag on the travel leg, then the method further includes: finding a final destination of the passenger; presenting a plurality of bag route options having a final destination of the bag that is the same as the final destination of the passenger; and identifying one bag route option from the plurality of bag route options, the one bag route option being the new bag route; printing the overlay bag tag that includes the original bag tag number and the new bag route information; securing the overlay bag tag to the bag; and routing the bag in accordance with the new bag route based on the overlay bag tag. In an exemplary embodiment, wherein, when it is determined that the passenger has not departed without the bag on the travel leg, then the method further includes: determining, using the computer system, whether the passenger is associated with an updated passenger route; wherein, when it is determined that the passenger is associated with the updated passenger route, then the updated passenger route is the new bag route; and wherein, when it is determined that the passenger is not associated with the updated passenger route, then generating a time stamp for the bag. In an exemplary embodiment, wherein the method further includes scanning, using the computer system, the overlay bag tag to identify the original bag tag number and the new bag route; and wherein scanning the overlay bag tag to identify the original bag tag number and the new bag route results in faster computation time within the computer system when trying to identify the passenger that is associated with the bag. In an exemplary embodiment, wherein the overlay bag tag omits a new bag tag number that is different than the original bag tag number; and wherein scanning the overlay bag tag to identify the original bag tag number and the new bag route improves the functioning of the computer system itself.

The present disclosure also introduces a luggage sortation system, the system including: a non-transitory computer readable medium; a printer that is in communication with one or more processors; a plurality of instructions stored on the non-transitory computer readable medium and executable by the one or more processors, the plurality of instructions including: instructions that cause the one or more processors to receive data associated with a first machine readable code that forms a portion of an original bag tag that is connected to a bag; instructions that cause the one or more processors identify, based on the data, an original bag tag number and an original bag route; instructions that cause the one or more processors determine that the original bag route is invalid; instructions that cause the one or more processors identify a new bag route when the original bag route is invalid; and instructions that cause the printer to print the overlay bag tag that includes the original bag tag number and the new bag route information, wherein a second machine readable code forms a portion of the overlay bag tag. In an exemplary embodiment, wherein instructions that cause the one or more processors to determine that the original bag route is invalid includes instructions that cause the one or more processors to match the original bag tag number with any one of: a reroute task that includes the original bag tag number; and a forward task that includes the original bag tag number. In an exemplary embodiment, wherein the reroute task is generated in response to a change in a final destination of the bag; wherein the bag is associated with a passenger; and wherein the forward task is generated in response to a route of the bag of deviating from the route of the passenger. In an exemplary embodiment, wherein instructions that cause the one or more processors to determine that the original bag route is invalid includes instructions that cause the one or more processors to match the original bag tag number with the forward task that includes the original bag tag number; wherein instructions that cause the one or more processors identify the new bag route when the original bag route is invalid includes instructions that cause the one or more processors: identify a final destination of the original bag route; and select the new bag route from a plurality of suggested bag routes; and wherein the final destination of the original bag route is the final destination of the new bag route. In an exemplary embodiment, wherein receiving data associated with the first machine readable code is in response to a scan of the first machine readable code. In an exemplary embodiment, wherein the plurality of instructions further comprise instructions that cause the one or more processors to receive data associated with the second machine readable code; wherein receiving data associated with the second machine readable code is in response to a scan of the second machine readable code; and wherein receiving data associated with the second machine readable code results in faster computation time within the computer system. In an exemplary embodiment, wherein the plurality of instructions further comprise instructions to receive data associated with the second machine readable code; wherein receiving data associated with the second machine readable code is in response to a scan of the second machine readable code; and wherein receiving data associated with the second machine readable code improves the functioning of the computer system itself. In an exemplary embodiment, wherein receiving data associated with the first machine readable code that forms the portion of an original bag tag that is connected to the bag is in response to a scan of the a first machine readable code by a first mobile device; wherein the instructions that cause the one or more processors to determine that the original bag route is invalid includes instructions that cause the one or more processors to match the original bag tag number with any one of: an open reroute task that includes the original bag tag number, the open reroute task being stored in a cache in the mobile device; and an open forward task that includes the original bag tag number, the open forward task being stored in the cache; and wherein printing the overlay bag tag closes at least one of the open reroute task and the open forward task.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to legacy systems within a variety of industries, such as shipping industries, train-related industries, etc.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. §112, paragraph 6 for any limitations of any of the claims herein, except for those in which the claim expressly uses the word "means" together with an associated function.

What is claimed is:

1. A method of printing an overlay bag tag, the method comprising:
   receiving, using a computer system, data associated with a first machine readable code that forms a portion of an original bag tag that is connected to a bag associated with a passenger;
   identifying, using the computer system and based on the data, an original bag tag number and an originally planned bag route;
   determining, using the computer system, that the originally planned bag route is invalid;
      wherein determining that the originally planned bag route is invalid comprises matching the original bag tag number with either:
         a reroute task that includes the original bag tag number; or
         a forward task that includes the original bag tag number;
   identifying, using the computer system and when the originally planned bag route is invalid, either:
      a new rerouted bag route that is the same as a travel route of the passenger, in response to the original bag number matching with the reroute task; or
      a new forwarded bag route that is different from the travel route of the passenger but has a final destination that is the same as the final destination of the passenger, in response to the original bag number matching with the forward task; and
   printing the overlay bag tag that includes the original bag tag number and information associated with either the new rerouted bag route or the new forwarded bag route, wherein a second machine readable code forms a portion of the overlay bag tag.

2. The method of claim 1,
   wherein the reroute task is generated by the computer system in response to a change in the travel route of the passenger;
   and
   wherein the forward task is generated by the computer system in response to a route of the bag deviating from the travel route of the passenger.

3. The method of claim 1,
   wherein determining that the originally planned bag route is invalid comprises matching the original bag tag number with the forward task that includes the original bag tag number;
   wherein identifying the new forwarded bag route when the originally planned bag route is invalid comprises:
      identifying a final destination of the originally planned bag route; and
      selecting the new forwarded bag route from a plurality of suggested bag routes; and
   wherein the final destination of the originally planned bag route is the final destination of the new forwarded bag route.

4. The method of claim 1, wherein receiving data associated with the first machine readable code is in response to a scan of the first machine readable code.

5. The method of claim 4,
   wherein the method further comprises receiving, using the computer system, data associated with the second machine readable code;
   wherein receiving data associated with the second machine readable code is in response to a scan of the second machine readable code; and
   wherein receiving data associated with the second machine readable code results in faster computation time within the computer system.

6. The method of claim 4,
   wherein the method further comprises receiving, using the computer system, data associated with the second machine readable code;

wherein receiving data associated with the second machine readable code is in response to a scan of the second machine readable code; and wherein receiving data associated with the second machine readable code improves the functioning of the computer system itself.

7. The method of claim 1, wherein receiving data associated with the first machine readable code that forms the portion of the original bag tag that is connected to the bag is in response to a scan of the a first machine readable code by a first mobile device;

wherein the reroute task is an open reroute task that is stored in a cache in the first mobile device; and wherein the forward task is an open forward task that is stored in the cache; and wherein printing the overlay bag tag closes at least one of the open reroute task and the open forward task.

8. A luggage sortation system, the system comprising:
a non-transitory computer readable medium;
a printer that is in communication with one or more processors;
a plurality of instructions stored on the non-transitory computer readable medium and executable by the one or more processors, the plurality of instructions comprising:
instructions that cause the one or more processors to receive data associated with a first machine readable code that forms a portion of an original bag tag that is connected to a bag associated with a passenger;
instructions that cause the one or more processors identify, based on the data, an original bag tag number and an originally planned bag route;
instructions that cause the one or more processors determine that the original bag route is invalid;
wherein instructions that cause the one or more processors to determine that the originally planned bag route is invalid comprises instructions that cause the one or more processors to match the original bag tag number with either:
a reroute task that includes the original bag tag number; or
a forward task that includes the original bag tag number;
instructions that cause the one or more processors identify, when the original bag route is invalid, either:
a new rerouted bag route that is the same as a travel route of the passenger, in response to the original bag number matching with the reroute task; or
a new forwarded bag route that is different from the travel route of the passenger but has a final destination that is the same as the final destination of the passenger, in response to the original bag number matching with the forward task; and
instructions that cause the printer to print an overlay bag tag that includes the original bag tag number and information associated with either the new rerouted bag route or the new forwarded bag route, wherein a second machine readable code forms a portion of the overlay bag tag.

9. The system of claim 8,
wherein the reroute task is generated in response to a change in the travel route of the passenger; and
wherein the forward task is generated in response to a route of the bag deviating from the travel route of the passenger.

10. The system of claim 8,
wherein instructions that cause the one or more processors to determine that the originally planned bag route is invalid comprises instructions that cause the one or more processors to match the original bag tag number with the forward task that includes the original bag tag number;
wherein instructions that cause the one or more processors identify the new forwarded bag route when the originally planned bag route is invalid comprises instructions that cause the one or more processors:
identify a final destination of the originally planned bag route; and
select the new forwarded bag route from a plurality of suggested bag routes; and
wherein the final destination of the originally planned bag route is the final destination of the new forwarded bag route.

11. The system of claim 8, wherein receiving data associated with the first machine readable code is in response to a scan of the first machine readable code.

12. The system of claim 11,
wherein the plurality of instructions further comprise instructions that cause the one or more processors to receive data associated with the second machine readable code;
wherein receiving data associated with the second machine readable code is in response to a scan of the second machine readable code; and
wherein receiving data associated with the second machine readable code results in faster computation time within the computer system.

13. The system of claim 11,
wherein the plurality of instructions further comprise instructions to receive data associated with the second machine readable code;
wherein receiving data associated with the second machine readable code is in response to a scan of the second machine readable code; and
wherein receiving data associated with the second machine readable code improves the functioning of the computer system itself.

14. The system of claim 8,
wherein receiving data associated with the first machine readable code that forms the portion of an original bag tag that is connected to the bag is in response to a scan of the a first machine readable code by a first mobile device;
wherein the reroute task is an open reroute task that is stored in a cache in the first mobile device; and
wherein the forward task is an open forward task that is stored in the cache; and
wherein printing the overlay bag tag closes at least one of the open reroute task and the open forward task.

\* \* \* \* \*

UNITED STATES PATENT AND TRADEMARK OFFICE
CERTIFICATE OF CORRECTION

PATENT NO. : 9,710,776 B1
APPLICATION NO. : 15/089096
DATED : July 18, 2017
INVENTOR(S) : Lewandowski Page 1 of 1

It is certified that error appears in the above-identified patent and that said Letters Patent is hereby corrected as shown below:

In the Specification

Column 4, Line 2, change "(CS S)" to -- (CSS) --.

Column 14, Line 29, change "SBAG-BCO" to -- 5BAG-BCO --.

Column 20, Line 19, change "foams a portion" to -- forms a portion --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*